United States Patent
Shundo

(10) Patent No.: US 6,824,709 B2
(45) Date of Patent: Nov. 30, 2004

(54) FLUORENE DERIVATIVES AND THEIR POLYMERS

(75) Inventor: Ryushi Shundo, Chiba (JP)

(73) Assignees: Chisso Corporation, Osaka (JP); Chisso Petrochemical Corporation, Tokyo (JP)

(*) Notice: Subject to any disclaimer, the term of this patent is extended or adjusted under 35 U.S.C. 154(b) by 0 days.

(21) Appl. No.: 10/317,093

(22) Filed: Dec. 12, 2002

(65) Prior Publication Data

US 2003/0203128 A1 Oct. 30, 2003

(30) Foreign Application Priority Data

Dec. 12, 2001 (JP) .......................... 2001-378508
Oct. 31, 2002 (JP) .......................... 2002-317433

(51) Int. Cl.[7] .................. C09K 19/52; C09K 19/32
(52) U.S. Cl. ................... 252/299.62; 252/299.67; 252/299.66; 428/1.1; 585/21; 570/125; 570/187
(58) Field of Search .................. 252/299.01, 299.6, 252/299.62, 299.63, 299.64, 299.65, 299.66; 585/24, 25, 26, 27; 428/1.1; 570/125, 187

(56) References Cited

U.S. PATENT DOCUMENTS 5,674,576 A * 10/1997 Gotoh et al. .................. 428/1
5,807,974 A * 9/1998 Kim et al. .................. 528/366
5,876,864 A * 3/1999 Kim et al. .................. 428/690

FOREIGN PATENT DOCUMENTS

| EP | 1 201 632 | * 5/2002 | ........... C07C/13/60 |
|---|---|---|---|
| JP | 07-017910 | 1/1995 | |
| JP | 08-003111 | 1/1996 | |
| JP | 09-316032 | 12/1997 | |

OTHER PUBLICATIONS

B. Ziemnicka and J. W. Doane, "Nematic Mesophases in 9–Methyl and 9–Bromo–2–Fluorenyl 4–Alkoxybenzoates", Mol. Cryst. Liq. Cryst., 1987, vol. 150b, pp. 361–373.

Peer Kirsch, Matthias Bremer, Andreas Taugerbeck and Tilman Wallmichrath, "Difluorooxymethylene–Bridged Liquid Crystals: A Novel Synthesis Based on the Oxidative Alkoxydifluorodesulfuration of Dithianylium Salts", Angew. Chem. Int. Ed., 2001, 40, No. 8, pp. 1480–1483.

Rafik Karaman, Dan T. Kohlman and James L. Fry, "Conversion of Aromatic Ketones, Benzyl Alcohols, and Alkyl Aryl Ethers to Aromatic Hydrocarbons with Lithium 4,4'–DI–t–Butylbiphenyl Radical Anion", Tetrahedron Letters, 1990, vol. 31, No. 43, pp. 6155–6158.

* cited by examiner

Primary Examiner—Shean C. Wu
Assistant Examiner—Jennifer R. Sadula
(74) Attorney, Agent, or Firm—Wenderoth, Lind & Ponack, LLP

(57) ABSTRACT

Provided are a fluorene derivative represented by Formula (1) and a polymer thereof:

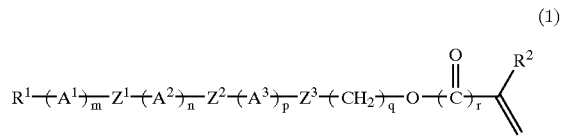

(1)

wherein at least one of $A^1$, $A^2$ and $A^3$ is a group represented by Formula (2), and the others are 1,4-cyclohexylene, 1,4-cyclohexenylene, 1,4-phenylene, pyridine-2,5-diyl, pyridazine-3,6-diyl, pyrimidine-2,5-diyl or dioxane-2,5-diyl; m, n and p are independently 0 or 1; $R^1$ is —CN, —CF$_3$, —CF$_2$H, —CFH$_2$, —OCF$_3$, —OCF$_2$H, —N=C=O, —N=C=S, —F, —Cl, or alkyl in which one hydrogen may be replaced by (meth)acryloyloxy or vinyloxy and optional —CH$_2$— may be replaced by —O—, —S—, —CF$_2$—, —CH=CH—, —COO—, —OCO— or —CO—; $R^2$ is hydrogen or methyl; $Z^1$ to $Z^3$ are independently a single bond, —O—, —COO—, —OCO—, —CF$_2$O—, —OCF$_2$—, —CH$_2$O—, —OCH$_2$—, —CH$_2$CH$_2$—, —(CH$_2$)$_4$—, —CH=CH—, —CF=CF— or —C≡C—; q is an integer of 0 to 10; and r is 0 or 1:

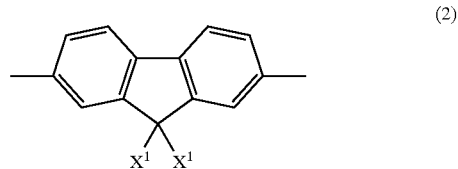

(2)

wherein two $X^1$'s are independently hydrogen, fluorine or alkyl.

38 Claims, No Drawings

FLUORENE DERIVATIVES AND THEIR POLYMERS

FIELD OF THE INVENTION

The present invention relates to a fluorene derivative having both of a polymerizing property and liquid crystallinity, a composition thereof and a polymer thereof. They can be used for a retardation film, a polarizer, a liquid crystal aligning film, a anti-reflection film and a viewing angle compensation film which are structural elements for a liquid crystal display device.

BACKGROUND OF THE INVENTION

Document 1: Japanese Patent Application Laid-Open No. 3111/1996

Document 2: Japanese Patent Application Laid-Open No. 17910/1995

Document 3: Japanese Patent Application Laid-Open No. 316032/1997

It is described in the document 1 that when a liquid crystal compound showing a polymerizing property is photopolymerized in the state that it is aligned, a state uniformly aligned is fixed and a polymer showing an optical anisotropy is obtained. Examples in which acrylate compounds were used as a liquid crystal compound showing a polymerizing property are described in the document 2 and the document 3. A high reactivity of the acrylate compounds and a transparency of the polymers are considered in these documents. Preferred examples of a polymerizable liquid crystalline acrylate compound are compounds (a) to (c) which are constituted by a cyclohexane ring and a benzene ring:

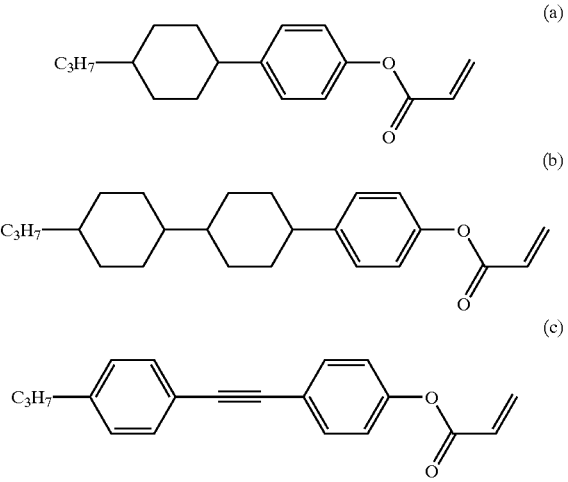

However, an optically anisotropic film prepared using a polymer of a publicly known acrylate compound did not have satisfactory characteristics in heat resistance and mechanical properties such as surface hardness.

SUMMARY OF THE INVENTION

A subject of the present invention is to solve the problems in prior art, and a novel liquid crystalline compound is provided for this purpose. That is, a first object of the present invention is to provide a polymerizable liquid crystalline compound which satisfies a large part of properties such as a broad temperature range of a liquid crystal phase, a high clearing point, a large optical anisotropy, a low viscosity, a high compatibility with the other liquid crystalline compounds, an excellent aligning property, a high photopolymerizing property and a high solubility in an organic solvent. A second object of the present invention is to provide a polymer which is prepared from this compound and which satisfies a large part of properties such as a heat resistance, a surface hardness, a large optical anisotropy, a low water permeability (a high hygroscopic dimensional stability), a high gas barrier property, an optimum heat contraction (an optimum thermal expansion coefficient), a small haze value, a high transparency, a suitable refractive index, a high solvent resistance, a high weatherability, a high glass transition point, a large light transmittance (a low light loss), a high wettability and an optimum thermoelasticity.

The present invention is constituted by the following items.

[1] A fluorene derivative represented by Formula (1):

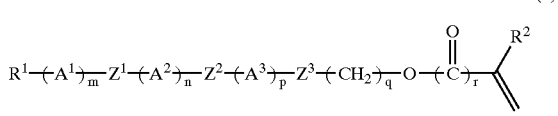

wherein $A^1$, $A^2$ and $A^3$ are independently a group represented by Formula (2), 1,4-cyclohexylene, 1,4-cyclohexenylene, 1,4-phenylene, pyridine-2,5-diyl, pyridazine-3,6-diyl, pyrimidine-2,5-diyl, dioxane-2,5-diyl, 1,4-cyclohexylene in which optional hydrogens are replaced by fluorines, or 1,4-phenylene in which optional hydrogens are replaced by fluorine and/or chlorine, and at least one of $A^1$, $A^2$ and $A^3$ is the group represented by Formula (2); m, n and p are independently 0 or 1, and the total thereof is 1 to 3; $R^1$ is —CN, —CF$_3$, —CF$_2$H, —CFH$_2$, —OCF$_3$, —OCF$_2$H, —N=C=O, —N=C=S, —F, —Cl or alkyl having 1 to 20 carbon atoms, and in this alkyl, one hydrogen may be replaced by (meth)acryloyloxy or vinyloxy and optional —CH$_2$— may be replaced by —O—, —S—, —CF$_2$—, —CH=CH—, —COO—, —OCO— or —CO—; $R^2$ is hydrogen or methyl; $Z^1$, $Z^2$ and $Z^3$ are independently a single bond, —O—, —COO—, —OCO—, —CF$_2$O—, —OCF$_2$—, —CH$_2$O—, —OCH$_2$—, —CH$_2$CH$_2$—, —(CH$_2$)$_4$—, —CH=CH—, —CF=CF— or —C≡C—; q is an integer of 0 to 10; and r is 0 or 1:

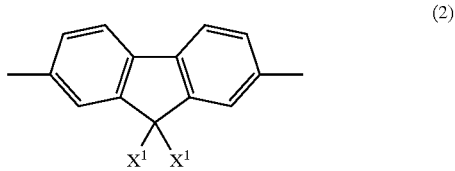

wherein two $X^1$'s are independently hydrogen, fluorine or alkyl having 1 to 8 carbon atoms.

[2] The fluorene derivative as described in the item [1], wherein both of two $X^1$'s in Formula (2) are hydrogens.

[3] The fluorene derivative as described in the item [1], wherein both of two $X^1$'s in Formula (2) are fluorines.

[4] The fluorene derivative as described in the item [1], wherein $R^2$ in Formula (1) is hydrogen.

[5] The fluorene derivative as described in the item [1], wherein $R^2$ in Formula (1) is methyl.

[6] The fluorene derivative as described in the item [1], wherein in Formula (1), $R^1$ is alkyl or alkoxy, and $R^2$ is hydrogen.

[7] The fluorene derivative as described in the item [1], wherein in Formula (1), $R^1$ is alkyl or alkoxy, and $R^2$ is methyl.

[8] The fluorene derivative as described in the item [1], wherein in Formula (1), $R^1$ is alkyl or alkoxy; $R^2$ is hydrogen; and both of two $X^1$'s in Formula (2) are hydrogens.

[9] The fluorene derivative as described in the item [1], wherein in Formula (1), $R^1$ is alkyl or alkoxy; $R^2$ is methyl; and both of two $X^1$'s in Formula (2) are fluorines.

[10] The fluorene derivative as described in the item [1], wherein in Formula (2), at least one $X^1$ is methyl.

[11] The fluorene derivative as described in the item [1], wherein in $A^1$, $A^2$ and $A^3$ in Formula (1), one of them is the group represented by Formula (2), and the other groups are independently 1,4-cyclohexylene, 1,4-phenylene, 1,4-cyclohexylene in which optional hydrogens are replaced by fluorines, or 1,4-phenylene in which optional hydrogens are replaced by fluorine and/or chlorine.

[12] The fluorene derivative as described in the item [1], wherein $R^1$ is a group having (meth)acryloyloxy or vinyloxy.

[13] The fluorene derivative as described in the item [1], wherein in $A^1$, $A^2$ and $A^3$ in Formula (1), one of them is the group represented by Formula (2), and the other groups are independently 1,4-cyclohexylene, 1,4-phenylene, 1,4-cyclohexylene in which optional hydrogens are replaced by fluorines, or 1,4-phenylene in which optional hydrogens are replaced by fluorine and/or chlorine; and $R^1$ is a group having (meth)acryloyloxy or vinyloxy.

[14] The fluorene derivative as described in the item [1], wherein in Formula (1), $A^2$ is the group represented by Formula (2); $A^1$ and $A^3$ are independently 1,4-cyclohexylene, 1,4-phenylene, 1,4-cyclohexylene in which optional hydrogens are replaced by fluorines, or 1,4-phenylene in which optional hydrogens are replaced by fluorine and/or chlorine; $R^1$ is a group represented by Formula (LT); $Z^3$ is —O—; and q is an integer of 2 to 10:

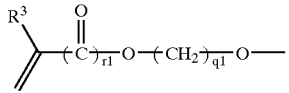
(LT)

wherein $R^3$ is hydrogen or methyl; r1 is 0 or 1; and q1 is an integer of 2 to 10.

[15] The fluorene derivative as described in the item [1], wherein in Formula (1), $A^2$ is the group represented by Formula (2); $A^1$ and $A^3$ are independently 1,4-cyclohexylene, 1,4-phenylene or 1,4-phenylene in which optional hydrogens are replaced by fluorines; $R^1$ is a group represented by Formula (LT-1); $R^2$ is hydrogen; $Z^1$ and $Z^2$ are independently a single bond, —CH$_2$CH$_2$—, —COO— or —OCO—; $Z^3$ is —O—; r is 1; and q is an integer of 2 to 10:

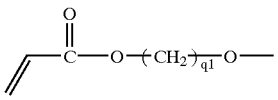
(LT-1)

wherein q1 is an integer of 2 to 10.

[16] The fluorene derivative as described in the item [1], wherein in Formula (1), $A^2$ is the group represented by Formula (2); $A^1$ and $A^3$ are independently 1,4-cyclohexylene, 1,4-phenylene or 1,4-phenylene in which optional hydrogens are replaced by fluorines; $R^1$ is a group represented by Formula (LT-2); $R^2$ is hydrogen; $Z^1$ and $Z^2$ are independently a single bond, —CH$_2$CH$_2$—, —COO— or —OCO—; $Z^3$ is —O—; r is 0; and q is an integer of 2 to 10:

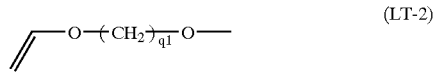
(LT-2)

wherein q1 is an integer of 2 to 10.

[17] The fluorene derivative as described in the item [15] or [16], wherein in Formula (1) described in the item [1], both of $Z^1$ and $Z^2$ are single bonds; and in Formula (2) described in the item [1], two $X^1$'s are independently hydrogen or methyl.

[18] The fluorene derivative as described in the item [15] or [16], wherein in Formula (1) described in the item [1], both of $Z^1$ and $Z^2$ are —CH$_2$CH$_2$—; in Formula (2) described in the item [1], two $X^1$'s are independently hydrogen or methyl.

[19] The fluorene derivative as described in the item [15] or [16], wherein in Formula (1) described in the item [1], $Z^1$ is —COO—, and $Z^2$ is —OCO—; and in Formula (2) described in the item [1], two $X^1$'s are independently hydrogen or methyl.

[20] A liquid crystal composition comprising at least one of the fluorene derivatives as described in the item [1] and at least one of the other liquid crystalline compounds.

[21] A liquid crystal composition comprising at least one of the fluorene derivatives as described in the item [13] and at least one of the other liquid crystalline compounds.

[22] A polymerizable composition comprising at least one of the fluorene derivatives as described in the item [1] and at least one of the other monomers.

[23] A polymerizable composition comprising at least one of the fluorene derivatives as described in the item [13] and at least one of the other monomers.

[24] A polymer comprising a structural unit represented by Formula (3):

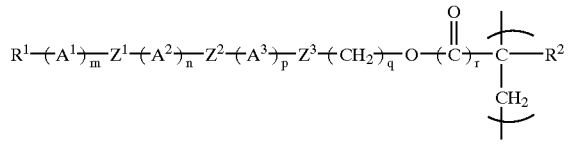
(3)

wherein $A^1$, $A^2$, $A^3$, m, n, p, $R^1$, $R^2$, $Z^1$, $Z^2$, $Z^3$, q and r have the same definitions as those of the symbols in Formula (1) described in the item [1].

[25] The polymer as described in the item [24], obtained from the polymerizable composition described in the item [23].

[26] An optically anisotropic film obtained using the polymer as described in the item [24].

[27] An aligning film obtained using the polymer as described in the item [24].

[28] A anti-reflection film obtained using the polymer as described in the item [24].

[29] A retardation film obtained using the polymer as described in the item [24].

[30] A viewing angle compensation film obtained using the polymer as described in the item [24].

[31] A polarizer obtained using the polymer as described in the item [24].

[32] A liquid crystal display device comprising the polymer as described in the item [24].

[33] A liquid crystal display device comprising the polymer as described in the item [25].

[34] A liquid crystal display device comprising at least one of the liquid crystal composition described in the item [21], the optically anisotropic film described in the item [26], the aligning film described in the item [27], the reflection reducing film described in the item [28], the retardation film as described in the item [29], the viewing angle compensation film as described in the item [30] and the polarizer as described in the item [31].

DETAILED DESCRIPTION OF THE INVENTION

First of all, the terms used in the present invention shall be explained. The meaning of the term 'liquid crystalline' in the present invention is not restricted only to having a liquid crystal phase. It is included in the meaning of the liquid crystalline that the compound itself does not have a liquid crystal phase but have such characteristics that it can be used as a component for a liquid crystal composition when it is mixed with the other liquid crystal compounds. The term 'optional' shows that not only the position but also the number is optional. However, it does not include the case where the number is 0. Both of alkyl and alkoxy may be either a straight or a branched group. The same shall apply when optional —CH$_2$— is replaced by —O— or —CH=CH— in these groups. (Meth)acryloyloxy means acryloyloxy or methacryloyloxy. (Meth)acrylate means acrylate or methacrylate. (Meth)acrylic acid means acrylic acid or methacrylic acid. 1,4-Cyclohexylene and dioxane-2,5-diyl may be either a trans form or a cis form unless otherwise described. The compound represented by Formula (1) may be shown as the compound (1). The same shall apply to the compounds represented by the other formulas.

The compound of the present invention is represented by Formula (1). The first characteristic of the compound (1) is to have a fluorene skeleton in a chemical structure thereof. A polymer obtained using the compound (1) shows very high characteristics in a mechanical strength and a heat resistance by having a fluorene skeleton. The second characteristic of the compound (1) is to show a high liquid crystallinity. The fluorene skeleton is considered to contribute to that the compound (1) has a wide temperature range of a liquid crystal phase and a suitable compatibility with the other liquid crystalline compounds.

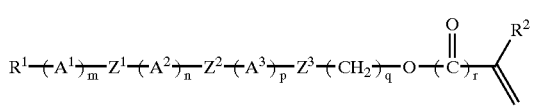

(1)

In Formula (1), at least one of $A^1$, $A^2$ and $A^3$ is a fluorene group represented by Formula (2); and m, n and p are independently 0 or 1, and the total thereof is 1 to 3.

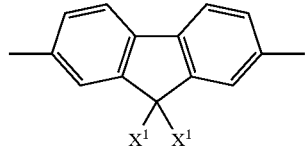

(2)

Two $X^1$'s in Formula (2) are independently hydrogen, fluorine or alkyl having 1 to 8 carbon atoms.

Accordingly, the compound (1) is, to be more specific, shown by Formula (1-1) to Formula (1-6):

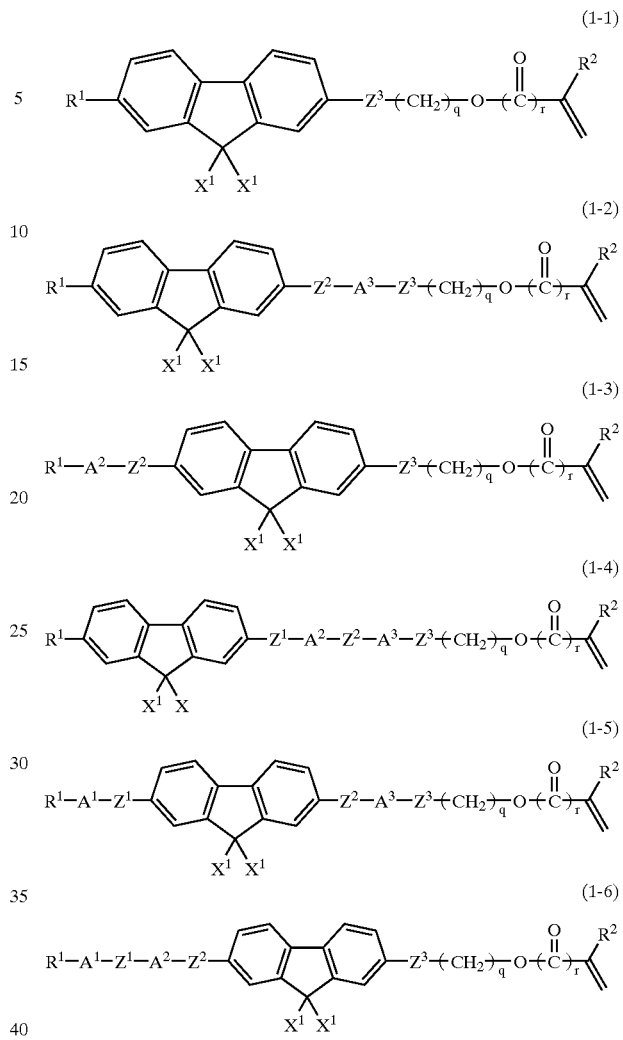

In these formulas, $A^1$ to $A^3$, $R^1$, $R^2$, $Z^1$ to $Z^3$, q and r have the same definitions as those of these symbols in Formula (1), and $X^1$ has the same definition as that of $X^1$ in Formula (2).

$A^1$, $A^2$ and $A^3$ in Formula (1) are independently, when they are not the groups represented by Formula (2), 1,4-cyclohexylene, 1,4-cyclohexenylene, 1,4-phenylene, pyridine-2,5-diyl, pyridazine-3,6-diyl, pyrimidine-2,5-diyl, dioxane-2,5-diyl, 1,4-cyclohexylene in which optional hydrogens are replaced by fluorines, or 1,4-phenylene in which optional hydrogens replaced by fluorine and/or chlorine. The preferred configuration for 1,4-cyclohexylene and dioxane-2,5-diyl is trans.

The preferred examples of $A^1$, $A^2$ or $A^3$ other than the fluorene group are 1,4-cyclohexylene, 2,2-difluoro-1,4-cyclohexylene, 3,3-difluoro-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene, pyridine-2,5-diyl, pyridazine-3,6-diyl and pyrimidine-2,5-diyl. Among them, the more preferred examples thereof are 1,4-cyclohexylene, 2,2-difluoro-1,4-cyclohexylene, 3,3-difluoro-1,4-cyclohexylene, 1,4-phenylene, 2-fluoro-1,4-phenylene, 3-fluoro-1,4-phenylene, 2,3-difluoro-1,4-phenylene, and 3,5-difluoro-1,4-phenylene.

$R^2$ in Formula (1) is hydrogen or methyl, and r is 0 or 1. That is, an end group at a right side of Formula (1) is vinyloxy or isopropenyloxy when r is 0, and it is acryloyloxy or methacryloyoxy when r is 1. Considering the polymerization reactivity, $R^2$ is preferably hydrogen.

$Z^1$, $Z^2$ and $Z^3$ in Formula (1) are independently a single bond, —O—, —COO—, —OCO—, —$CF_2$O—, —$OCF_2$—, —$CH_2$O—, —$OCH_2$—, —$CH_2CH_2$—, —$(CH_2)_4$—, —CH=CH—, —CF=CF— or —C≡C—. When $Z^1$, $Z^2$ or $Z^3$ is —COO—, —OCO—, —$CF_2$O—, —$OCF_2$—, —CH=CH— or —C≡C—, the compound (1) shows a liquid crystal phase in a wide temperature range. When $Z^1$, $Z^2$ or $Z^3$ is —$CF_2$O— or —$OCF_2$—, the compound (1) has a relatively small viscosity. In Formula (1), q is an integer of 0 to 10. When q is 0, $Z^1$, $Z^2$ or $Z^3$ connected to an end group (RT) in Formula (1) is a single bond:

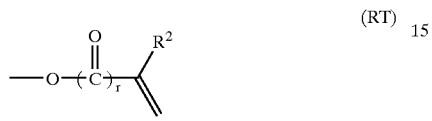

(RT)

$R^1$ in Formula (1) is —CN, —$CF_3$, —$CF_2H$, —$CFH_2$, —$OCF_3$, —$OCF_2H$, —N=C=O, —N=C=S, —F, —Cl or alkyl having 1 to 20 carbon atoms. In this alkyl, one hydrogen may be replaced by (meth)acryloyloxy or vinyloxy, and optional —$CH_2$— may be replaced by —O—, —S—, —$CF_2$—, —CH=CH—, —COO—, —OCO— or —CO—. However, not preferred is a group in which a plurality of continuous —$CH_2$— is replaced by —O—, —S—, —COO—, —OCO— or —CO—. The preferred examples of $R^1$ are —CN, —$CF_3$, —$CF_2H$, —$CFH_2$, —$OCF_3$, —$OCF_2H$, straight alkyl having 1 to 10 carbon atoms, straight alkoxy having 1 to 10 carbon atoms, straight alkoxyalkyl having 2 to 10 carbon atoms, and these alkyl, alkoxy and alkoxyalkyl groups in which one hydrogen is replaced by (meth)acryloyloxy or vinyloxy. The example of the group in which one hydrogen is replaced by (meth) acryloyloxy or vinyloxy is a group represented by Formula (LT):

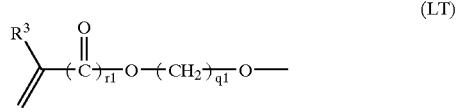

(LT)

wherein $R^3$ is hydrogen or methyl; r1 is 0 or 1; and q1 is an integer of 2 to 10.

The more preferred specific examples of $R^1$ are —CN, —$CF_3$, —$CF_2H$, —$CFH_2$, —$OCF_3$, —$OCF_2H$, methyl, ethyl, propyl, butyl, pentyl, hexyl, heptyl, octyl, nonyl, decyl, methoxy, ethoxy, propyloxy, butyloxy, pentyloxy, hexyloxy, heptyloxy, octyloxy, nonyloxy, decyloxy, methoxymethyl, methoxyethyl, a group represented by (LT-1) and a group represented by (LT-2). Among them, the particularly preferred groups are alkyl, alkoxy, the group represented by (LT-1) and the group represented by (LT-2).

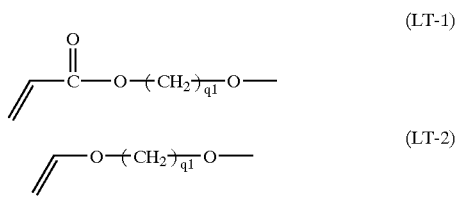

(LT-1)

(LT-2)

wherein q1 is an integer of 2 to 10.

The preferred example of the compound in which $R^1$ is the group represented by Formula (LT) is a compound represented by the following formula:

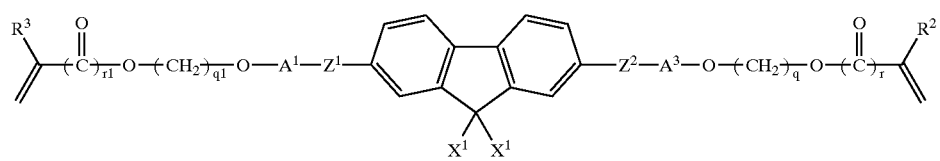

wherein $A^1$ and $A^3$ are independently 1,4-cyclohexylene, 1,4-phenylene, 1,4-cyclohexylene in which optional hydrogens are replaced by fluorines, or 1,4-phenylene in which optional hydrogens are replaced by fluorine and/or chlorine; $R^2$ and $R^3$ are independently hydrogen or methyl; $Z^1$ and $Z^2$ are independently a single bond, —O—, —COO—, —OCO—, —$CF_2$O—, —$OCF_2$—, —$CH_2$O—, —$OCH_2$—, —$CH_2CH_2$—, —$(CH_2)_4$—, —CH=CH—, —CF=CF— or —C≡C—; q and q1 are independently an integer of 2 to 10; r and r1 are independently 0 or 1; and two $X^1$'s are independently hydrogen or methyl.

The preferred examples of the compound in which $R^1$ is the group represented by Formula (LT-1) and the preferred examples of the compound in which $R^1$ is the group represented by Formula (LT-2) shall be shown below:

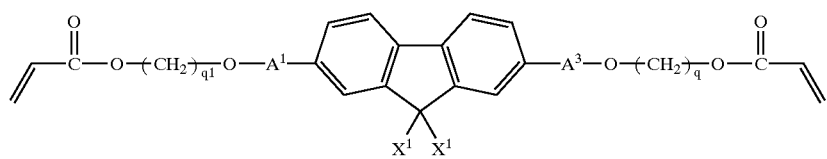

-continued

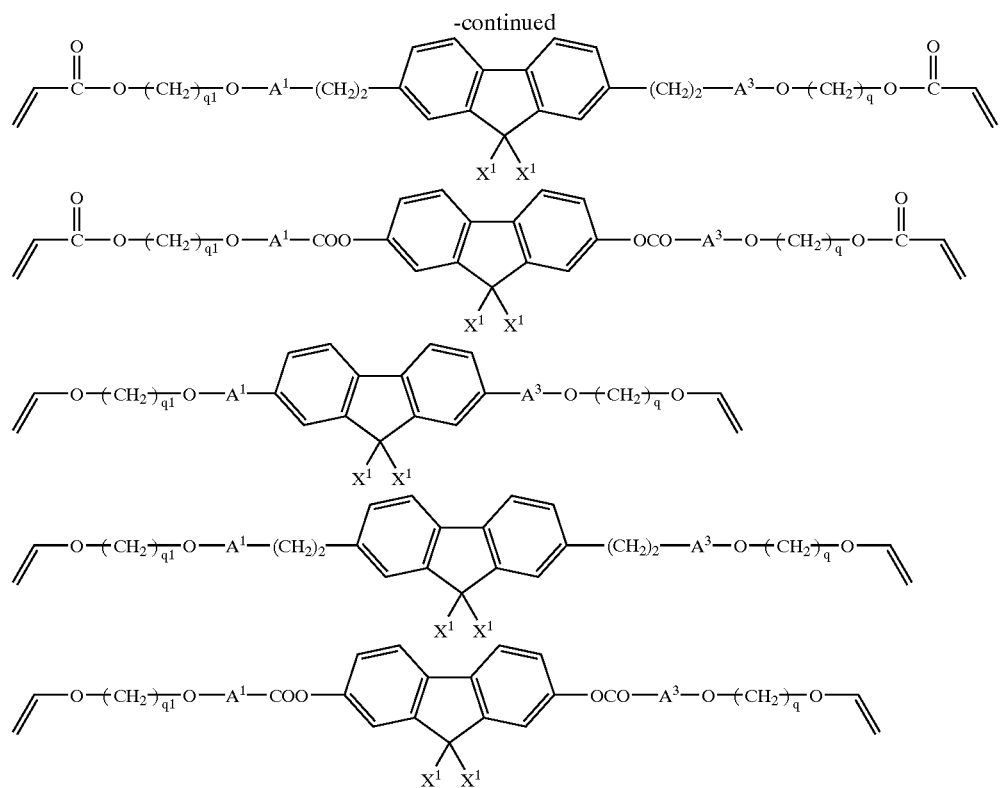

In these formulas, $A^1$ and $A^3$ are independently 1,4-cyclohexylene, 1,4-phenylene or 1,4-phenylene in which optional hydrogens are replaced by fluorines; q and q1 are independently an integer of 2 to 10; and two $X^1$'s are independently hydrogen or methyl.

Next, a production process for the fluorene derivative represented by Formula (1) shall be explained. The compound (1) can easily be produced by suitably combining publicly known reaction processes described in Houben-Wyle, Methods of Organic Chemistry (George Thieme Verlag, Stuttgart), Organic Syntheseses (John Wily & Sons, Inc.), Organic Reactions (John Wily & Sons, Inc.), Comprehensive Organic Synthesis (Pergamon Press), and New Experimental Chemistry Course (Maruzen). In this case, commercial products can be used for 2-bromofluorene, 2,7-dibromofluorene, 2-bromo-7-pentylfluorene and 2-amino-7-bromofluorene. Also, the production processes of 2-bromo-7-hydroxyfluorene and 7-bromofluorene-2-carboxylic acid are reported (Mol. Cryst. Liq. Cryst., 1987, 150B, 361-73). The production processes in which these compounds are used as raw materials shall specifically be explained.

A fluorene derivative in which in Formula (1), $A^1$ is fluorene-2,7-diyl, $Z^1$ is a single bond, and r is 1 can be synthesized by Scheme 1:

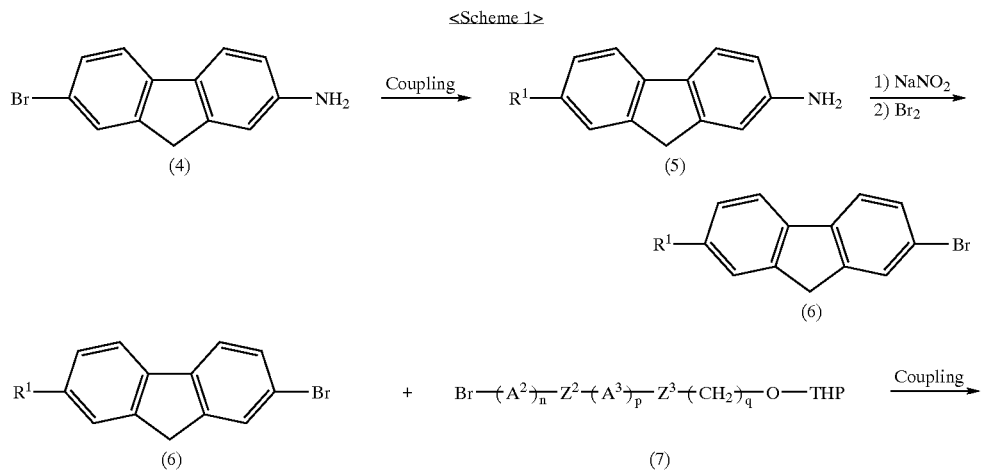

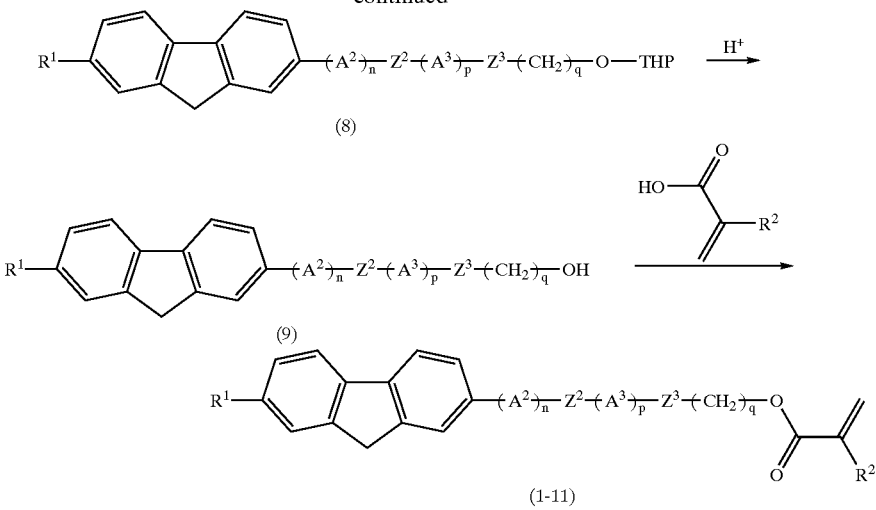

A substituent $R^1$ such as alkyl is introduced into 2-amino-7-bromofluorene (4) to obtain 2-substituted-7-aminofluorene (5). The compound (5) is turned into a diazonium salt, and then halogen such as bromine is reacted therewith, whereby 2-substituted-7-bromofluorene (6) is obtained. A compound (8) is obtained by a cross-coupling reaction of the compound (6) with a bromide (7). A protective group for a hydroxyl group may be one usually used in organic synthetic chemistry such as tetrahydropyranyloxy (THP), but a protective group which is optimum for the conditions of the cross-coupling reaction has to be selected. A compound (9) is obtained by removing the protective group from the compound (8) under an acidic condition. The compound (9) is subjected to dehydration condensation with various acrylic acid compounds to thereby obtain a compound (1-11). In the dehydration condensation reaction, a condensing agent such as dicyclohexylcarbodiimide (DCC) can be used. When an acid chloride of an acrylic acid compound is available, the compound (9) may be esterified by reacting with the acid chloride under a basic condition.

A fluorene derivative in which in Formula (1), $A^1$ is fluorene-2,7-diyl, $Z^1$ is —COO—, and r is 1 can be synthesized by Scheme 2:

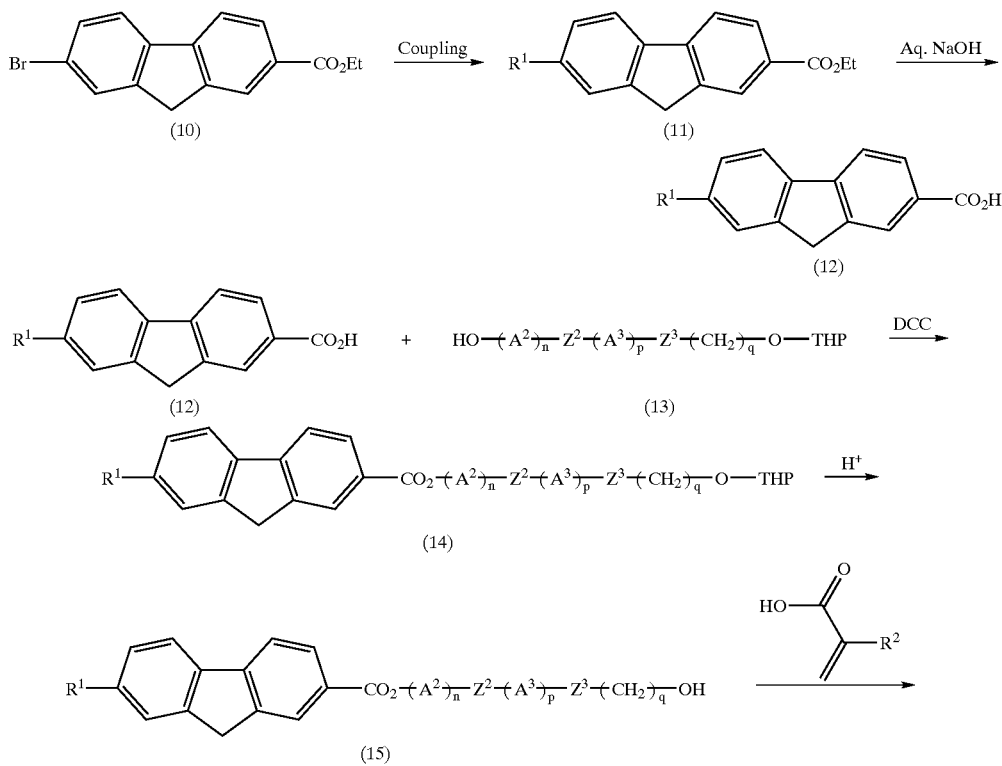

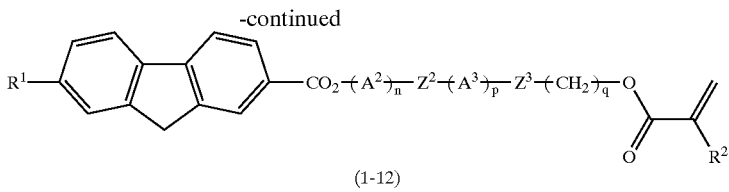

(1-12)

A substituent $R^1$ is introduced into ethyl 7-bromofluorene-2-carboxylate (10) by the method described in above Scheme 1. The resulting compound (11) is hydrolyzed under a basic condition to thereby obtain a corresponding compound (12). The compound (12) is subjected to dehydration condensation with a compound (13) using the method described in Scheme 1, whereby a compound (14) is obtained. A compound (15) is obtained by removing a protective group for the compound (14). The compound (15) is derived into a compound (1-12) by reacting with an acrylic acid compound.

A fluorene derivative in which in Formula (1), $A^1$ is fluorene-2,7-diyl, $Z^1$ is —OCO—, and r is 1 can be synthesized by Scheme 3:

A substituent $R^1$ is introduced into a bromide (16) by the method described above and then reacted with a compound (18) to prepare a compound (19). A protective group for the compound (19) is removed to obtain a compound (20), and then this is subjected to dehydration condensation with an acrylic acid compound, whereby a compound (1-13) is obtained. A fluorene derivative having a hydroxyl group such as a compound (17) can be produced as well by acetylating fluorene by a Friedel-Crafts reaction, then carrying out a Baeyer•Villiger reaction with a peroxide and finally carrying out hydrolysis. One example of this method shall be explained in Example 1 described later.

A fluorene derivative in which in Formula (1), $A^1$ is fluorene-2,7-diyl, $Z^1$ is —$CF_2O$—, and r is 1 can be synthesized by Scheme 4:

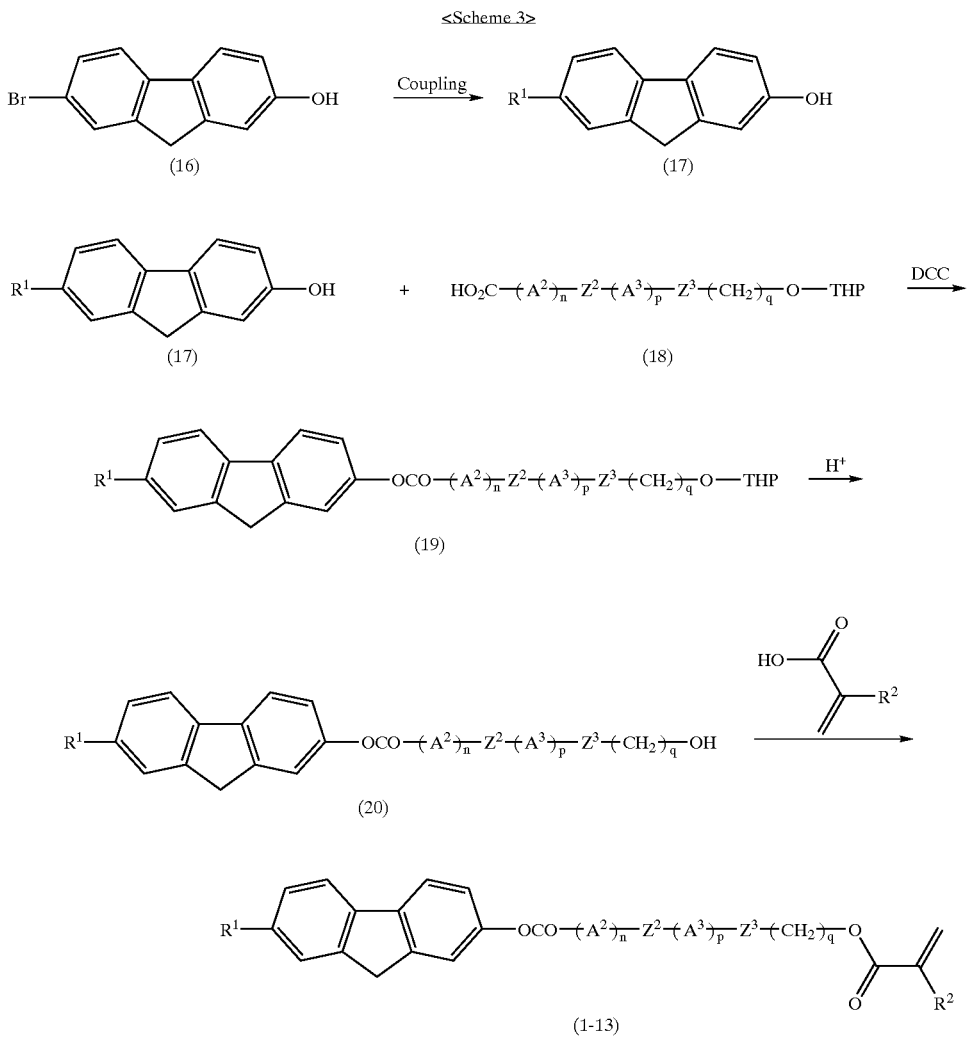

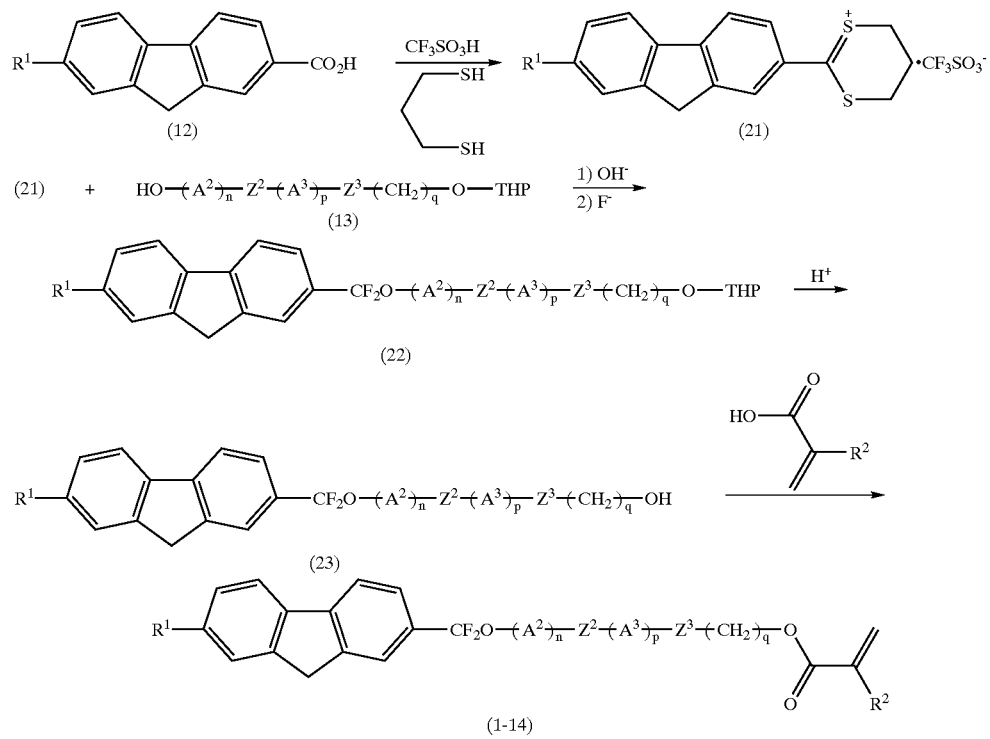

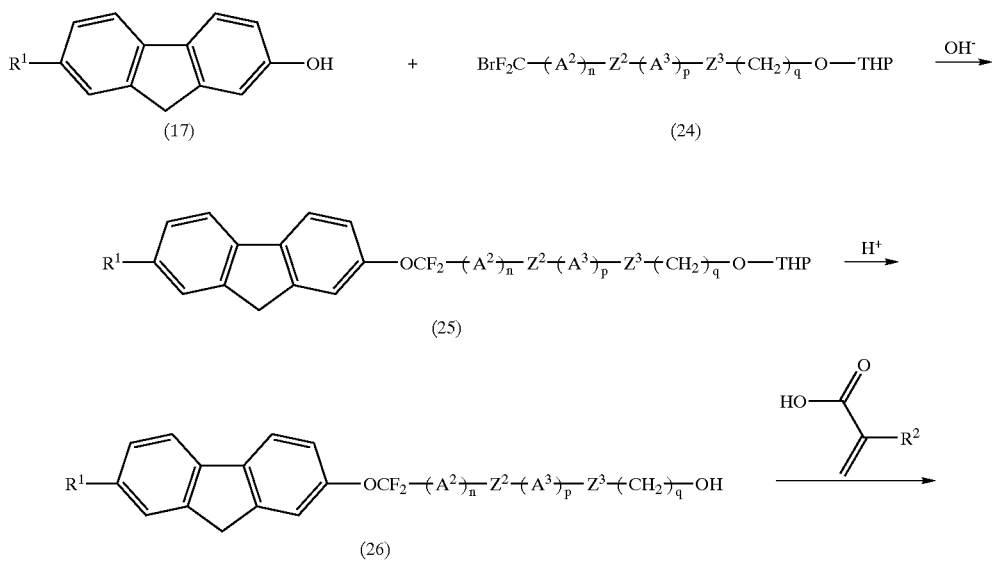

The carboxylic acid (12) described above is reacted with 1,3-propanedithiol and trifluoromethanesulfonic acid according to a method of a literature (Angew. Chem. Int. Engl., 2001, 40 (8), 1480), whereby an intermediate (21) which is stable at a room temperature is obtained. This is reacted with the compound (13) under a basic condition, and the resulting dithiane compound is reacted with a nucleophilic fluorinating agent such as DAST ((diethylamino) sulfur trifluoride) or an HF/triethylamine complex, whereby a compound (22) is obtained. A protective group for this compound is removed to prepare a compound (23), and then this compound is subjected to dehydration condensation with an acrylic acid compound, whereby a compound (1-14) is obtained.

A fluorene derivative in which in Formula (1), $A^1$ is fluorene-2,7-diyl, $Z^1$ is —$OCF_2$—, and r is 1 can be synthesized by Scheme 5:

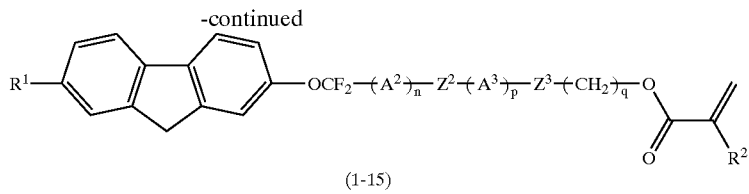

(1-15)

The compound (17) described above is reacted with a compound (24) under a basic condition to prepare a compound (25). A protective group for the compound (25) is removed under an acidic condition, and the resulting compound (26) is reacted with an acrylic acid compound, whereby a compound (1-15) is obtained.

A fluorene derivative in which in Formula (1), $A^1$ is fluorene-2,7-diyl, $Z^1$ is —$CH_2O$—, and r is 1 can be synthesized by Scheme 6:

The compound (11) described above is derived into a compound (27) by a reducing agent such as lithium aluminum hydride. A hydroxyl group of the compound (27) is halogenated with a halogenating agent. If hydrogen bromide is used as the halogenating agent, a compound (28) is obtained. The compound (28) is reacted with the compound (13) under a basic condition to prepare a compound (29). The compound (29) is derived into a compound (1-16) by removing a protective group and then subjecting to dehydration condensation with an acrylic acid compound.

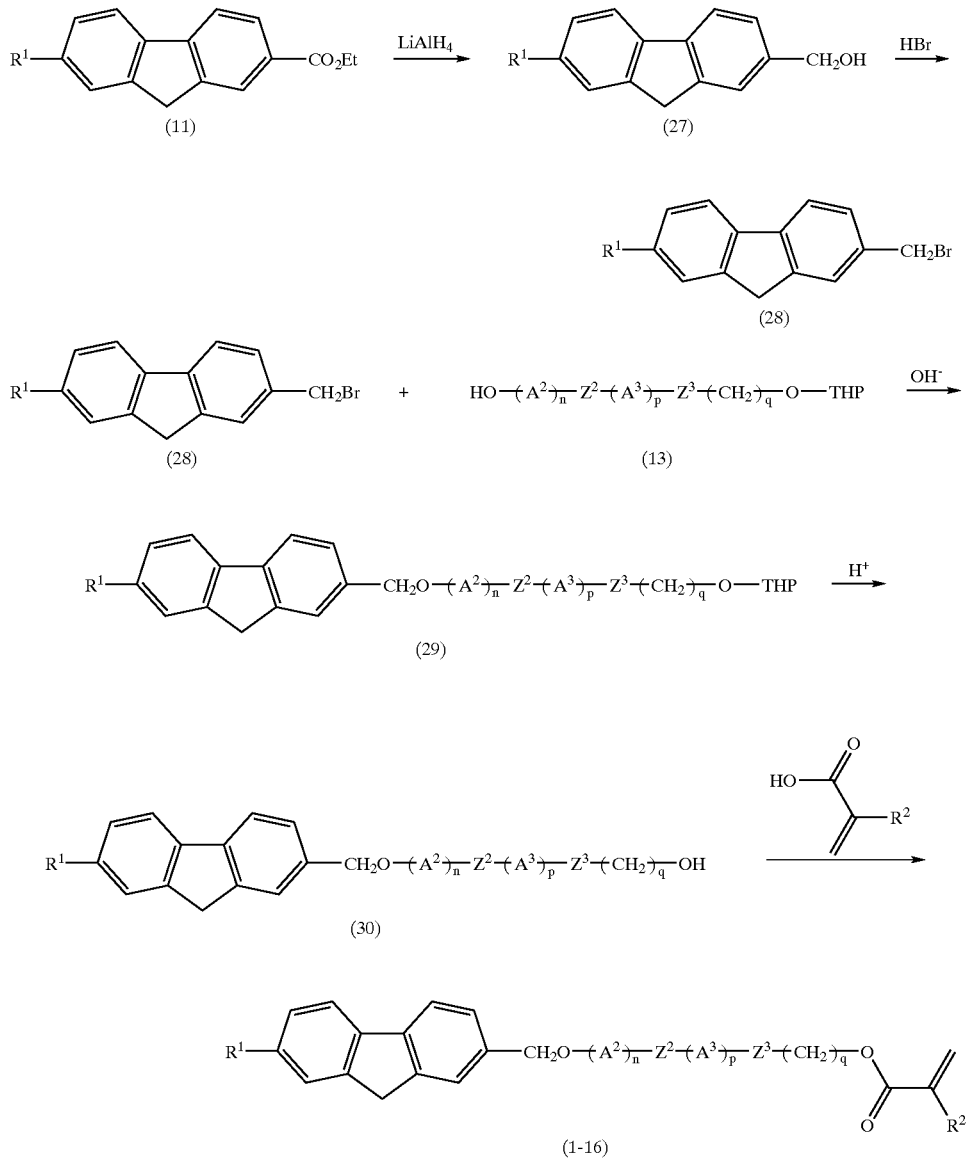

A fluorene derivative in which in Formula (1), $A^1$ is fluorene-2,7-diyl, $Z^1$ is —OCH$_2$—, and r is 1 can be synthesized by Scheme 7:

compound (33) is subjected to dehydration condensation with an acrylic acid compound, whereby a compound (1-17) is obtained.

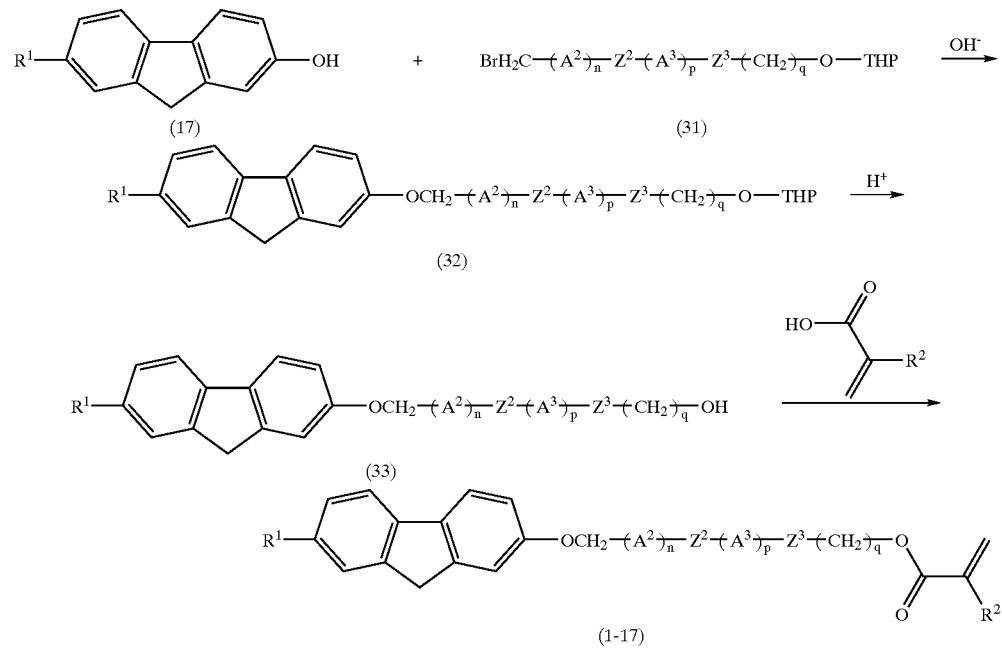

The compound (17) described above is reacted with a compound (31) under a basic condition to prepare a compound (32). A protective group is removed from the compound (32) under an acidic condition, and then the resulting A fluorene derivative in which in Formula (1), $A^1$ is fluorene-2,7-diyl, $Z^1$ is —CH=CH—, and r is 1 can be synthesized by Scheme 8:

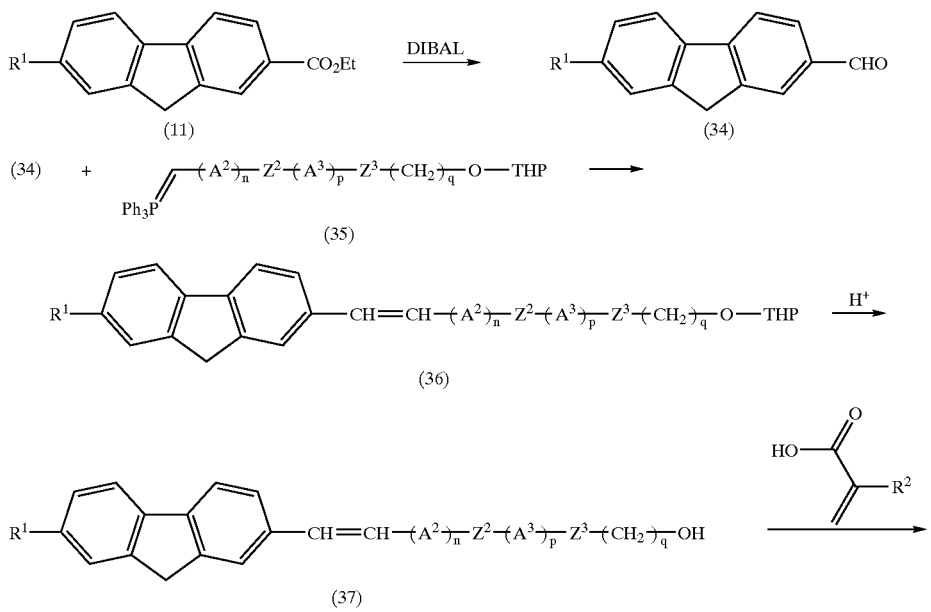

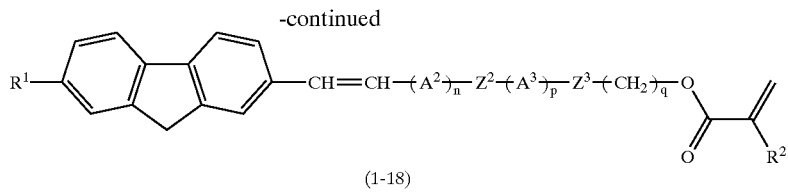

(1-18)

The compound (11) described above is reduced by a reducing agent such as DIBAL (diisobutylaluminum hydride) to obtain a compound (34). The compound (34) is reacted with a compound (35) to obtain a compound (36). A protective group of the compound (36) is removed under an acidic condition to obtain an alcohol (37). The compound (37) is subjected to dehydration condensation with an acrylic acid compound, whereby a compound (1-18) is obtained.

A fluorene derivative in which in Formula (1), $A^1$ is fluorene-2,7-diyl, $Z^1$ is —CF=CF—, and r is 1 can be synthesized by Scheme 9:

The bromide (6) described above is treated with n-BuLi to prepare a corresponding lithium compound, and then it is reacted with tetrafluoroethylene to obtain a compound (38). The compound (7) is treated with n-BuLi to prepare a corresponding lithium compound, and then it is reacted with the compound (38) to obtain a compound (39). A protective group of the compound (39) is removed under an acidic condition to prepare a compound (40). The compound (40) is subjected to dehydration condensation with an acrylic acid compound, whereby a compound (1-19) is obtained.

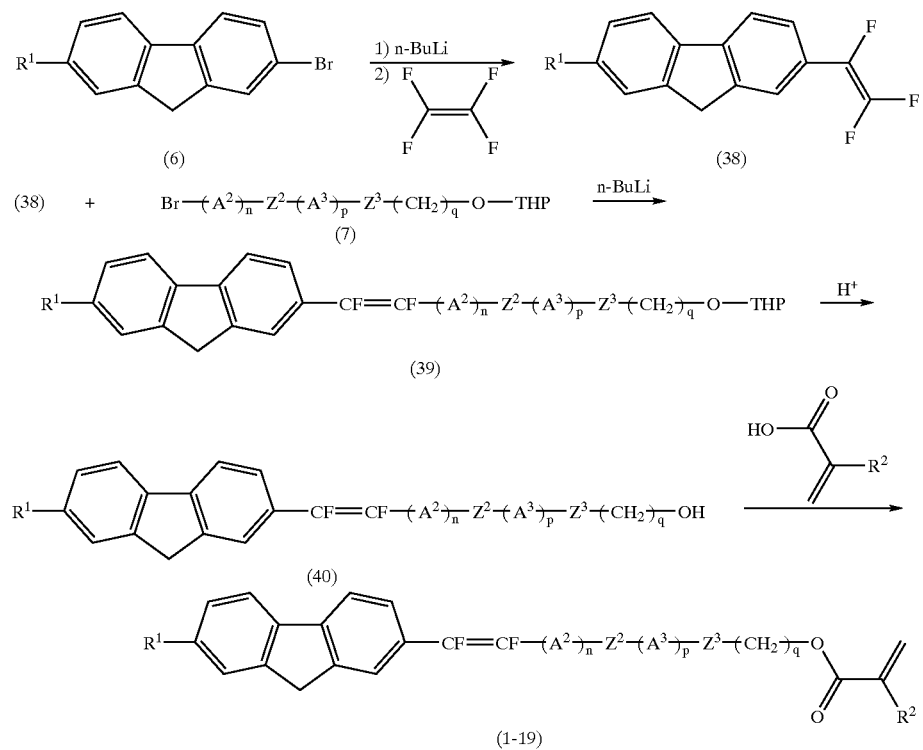

A fluorene derivative in which in Formula (1), $A^1$ is fluorene-2,7-diyl and $Z^1$ is —C≡C— and in which r is 1 can be synthesized by Scheme 10:

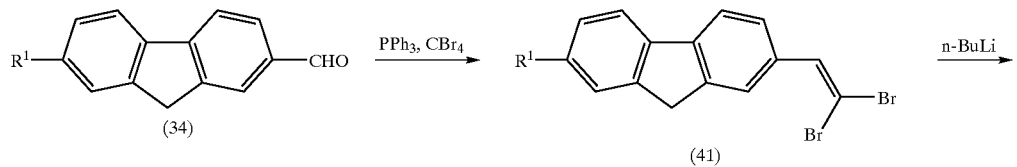

-continued

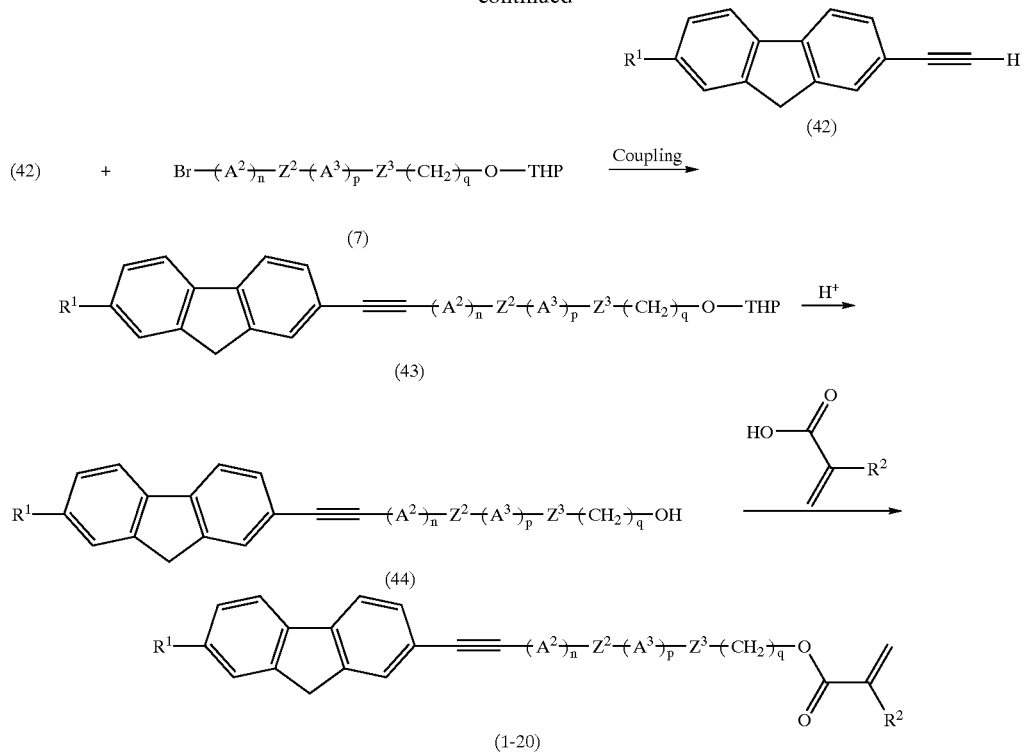

The compound (34), the synthetic method of which has been shown previously, is reacted with triphenylphosphine and carbon tetrabromide to obtain a compound (41). The compound (41) is treated with a base such as n-BuLi to thereby obtain a compound (42). The compound (42) is subjected to cross-coupling with the compound (7) making use of, for example, a Castro reaction or a Sonogashira reaction to thereby obtain a compound (43). A protective group of the compound (43) is removed under an acidic condition, and then the resulting compound (44) is subjected to dehydration condensation with an acrylic acid compound, whereby a compound (1-20) is obtained. A linkage group —C≡C— can be introduced as well into a fluorene ring by subjecting a corresponding fluorene bromide product to a coupling reaction with acetylene in which one hydrogen atom is protected with TMS (trimethylsilyl) and then removing the protective group.

A fluorene derivative in which $X^1$ in Formula (2) is fluorine and r in Formula (1) is 1 can be synthesized by Scheme 11:

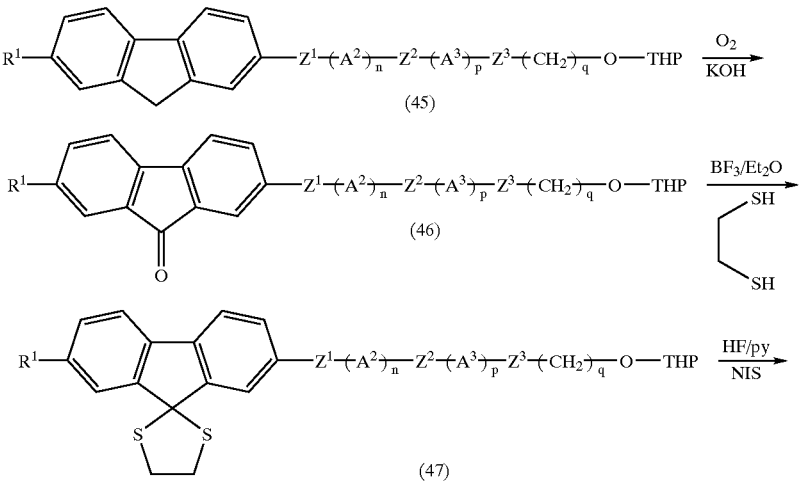

-continued

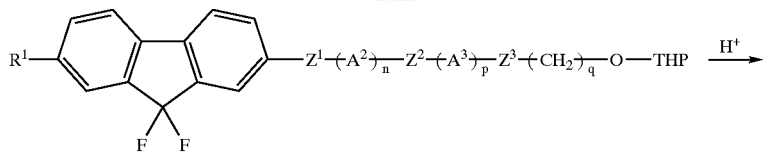

(48)

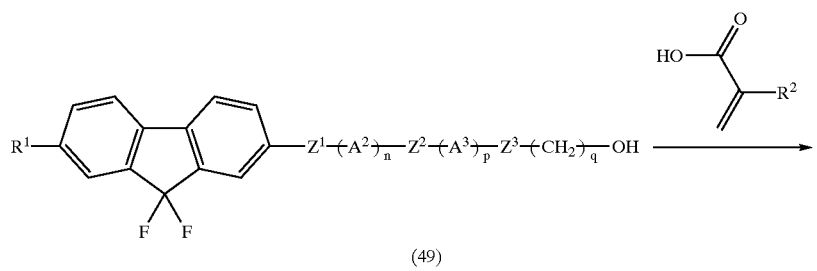

(49)

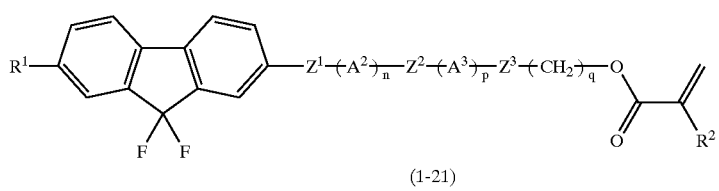

(1-21)

A compound (45) is oxidized by oxygen under a base condition to thereby obtain a compound (46). The compound (46) is derived into a compound (47) by reacting with ethanedithiol. The compound (47) is fluorinated with a nucleophilic fluorinating agent to thereby obtain a compound (48). A protective group of the compound (48) is removed under an acidic condition, and then the resulting compound (49) is subjected to dehydration condensation with an acrylic acid compound, whereby a compound (1-21) is obtained. A fluorene derivative in which $X^1$ in Formula (2) is alkyl is obtained by reacting the compound (46) with two equivalents of alkyl halide.

A fluorene derivative in which both of $X^1$'s in Formula (2) are methyl can be synthesized by Scheme 12:

A compound (50) can be produced by reacting the fluorenone derivative (46) described above with two or more equivalents of methyl iodide in the presence of a base, particularly a radical anion. When the reaction is slow, irradiation with a ultrasonic field is effective. This production process can be referred to a literature (Tetrahedron Lett., 1990, 31 (43), 6155). Methyl can be introduced at any stage. For example, the compound (1) can be produced as well by introducing methyl into commercially available fluorenone on the conditions described above, and then modifying 2- and 7-positions of the fluorene ring. The compound (1) in which $X^1$ in Formula (2) is alkyl having 2 or more carbon atoms can be produced by using alkyl iodide having 2 or more carbon atoms in place of methyl iodide.

<Scheme 12>

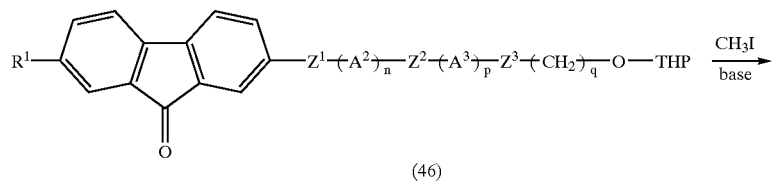

(46)

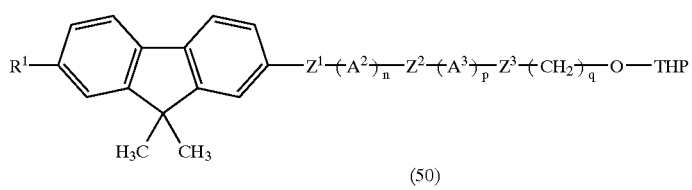

(50)

A fluorene derivative in which one of $X^1$'s in Formula (2) is methyl and the other is hydrogen can be synthesized by Scheme 13:

<Scheme 13>

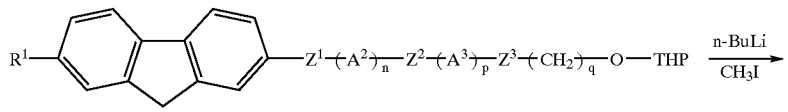

(45)

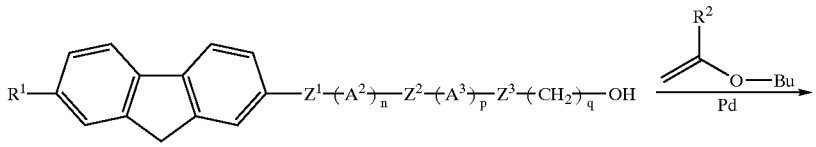

(51)

A compound (51) can be produced by reacting the fluorene derivative (45) described above with a base and then methyl iodide. A hydrogen atom at a 9-position of fluorene has a high acidity and is readily subjected to deprotonation with a base such as n-butyllithium, and therefore methyl can be introduced thereinto at any stage. For example, the compound (1) can be produced as well by introducing methyl into commercially available fluorene on the conditions described above and then modifying 2- and 7-positions of the fluorene ring. The compound (1) in which $X^1$ is alkyl having 2 or more carbon atoms can be produced by using alkyl iodide having 2 or more carbon atoms in place of methyl iodide. In this process, a fluorene derivative in which both of $X^1$'s are alkyls can be derived by using two equivalents of n-butyllithium.

A fluorene derivative in which r in Formula (1) is 0 is vinyl ether. A compound (1-22) can be produced by reacting a compound (52) with vinyl ether in the presence of a metal catalyst.

<Scheme 14>

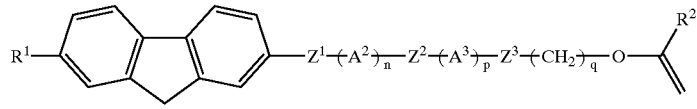

(52)

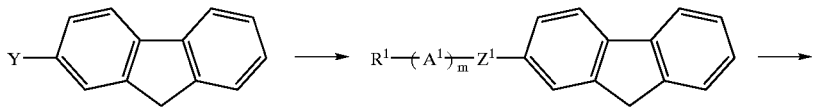

(1-22)

A fluorene derivative in which in Formula (1), $A^2$ is fluorene-2,7-diyl can be synthesized by Scheme 15:

<Scheme 15>

(53)   Y = Br, CO$_2$H, or OH                              (54)

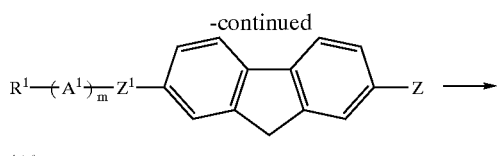

(55)   Z = NH$_2$, CO$_2$Et, OH, or CHO

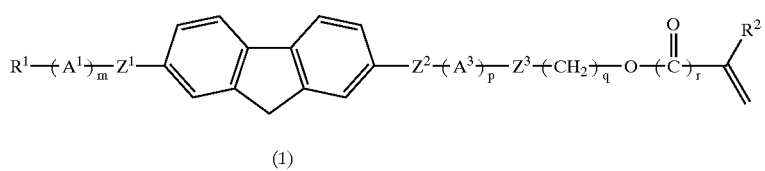

(1)

A compound (54) having a ring A$^1$ is obtained by using a commercial fluorene derivative (53) (a compound in which Y is Br, OH or COOH) and applying the processes described in Schemes 1 to 10. F can be introduced into a 9-position of a fluorene ring in the compound (54) by applying the process described in Scheme 11. A compound (55) is obtained by introducing an amino group, an ethoxycarbonyl group, a hydroxyl group or a hydrocarbonyl group into a 7-position of a fluorene ring in the compound (54). An amino group, an ethoxycarbonyl group, a hydroxyl group and a hydrocarbonyl group can be introduced by publicly known conventional methods. For example, an amino group can be introduced by nitration with fuming nitric acid and reduction reaction subsequent thereto. An ethoxycarbonyl group can be introduced by carrying out in order acetylation by a Friedel-Crafts reaction, oxidation by sodium hypochlorite and esterification. A hydroxyl group can be introduced by reduction of an amino group to diazonium with sodium nitrite and hydrolysis by sulfuric acid subsequent thereto. A hydrocarbonyl group can be introduced by the reduction of an ethoxycarbonyl group with diisobutylaluminum hydride. The resulting compound (55) can be derived into the compound (1) by applying the processes described in schemes 1 to 14. The compound (1) in which A$^3$ is a fluorene ring can be synthesized as well by applying the processes described in Schemes 1 to 14.

Among the fluorene derivatives obtained by these production processes, the examples of the compound showing particularly preferred characteristics shall specifically be shown. In the following examples, 1,4-cyclohexylene is preferably a trans form.

No. 1

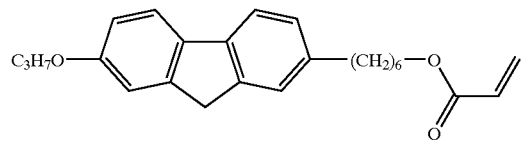

No. 2

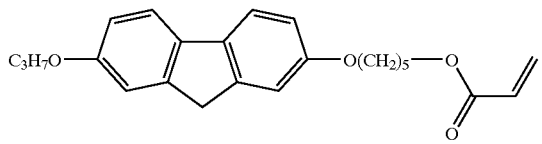

No. 3

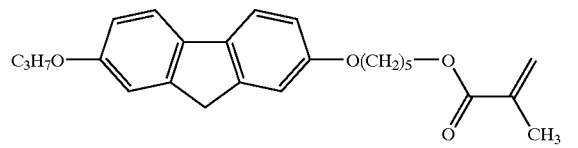

No. 4

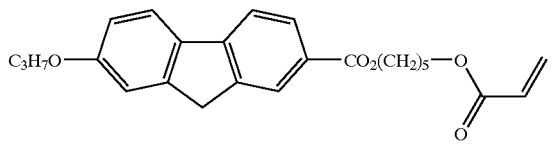

No. 5

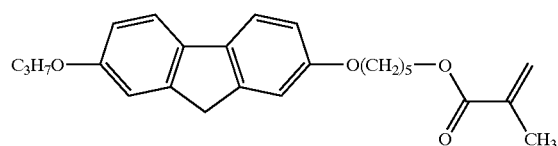

No. 6

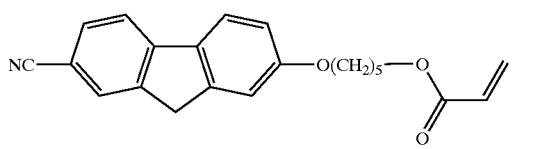

No. 7

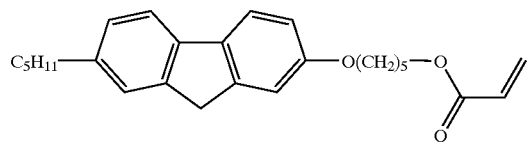

No. 8

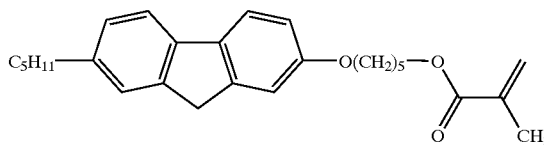

-continued
No. 9
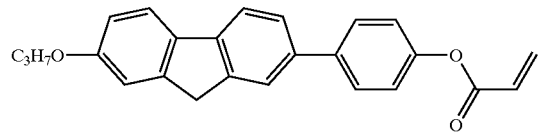
No. 10
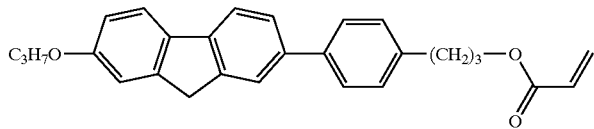
No. 11
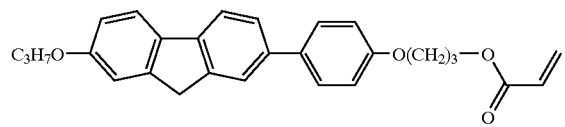
No. 12
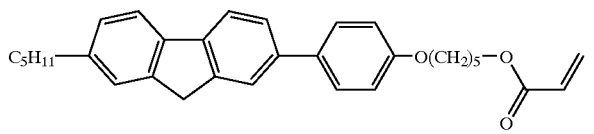
No. 13
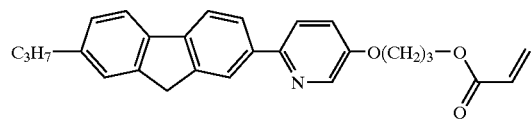
No. 14
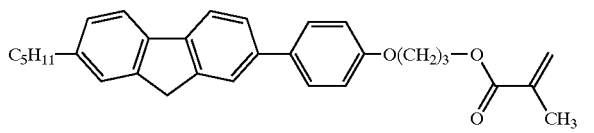
No. 15
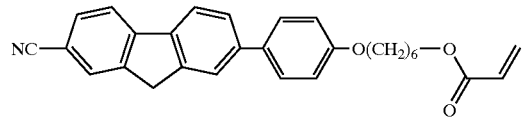
No. 16
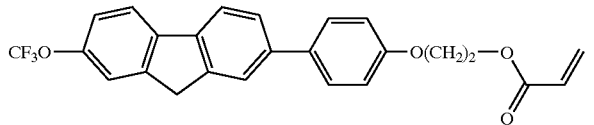
No. 17
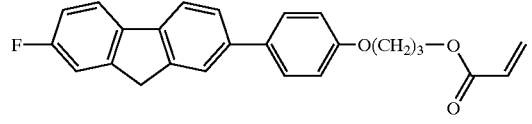
No. 18
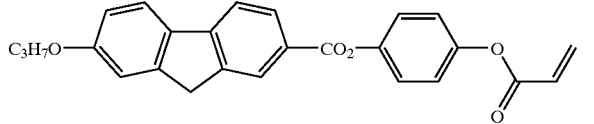
No. 19
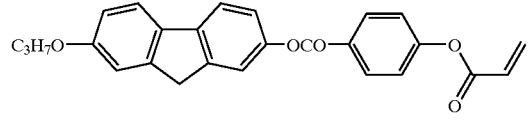
No. 20
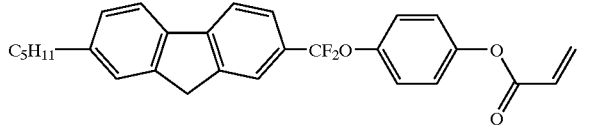
No. 21
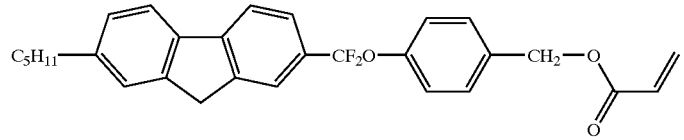
No. 22
No. 23
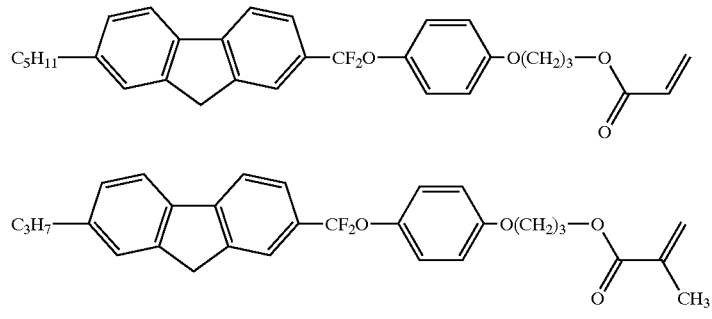
No. 24

-continued
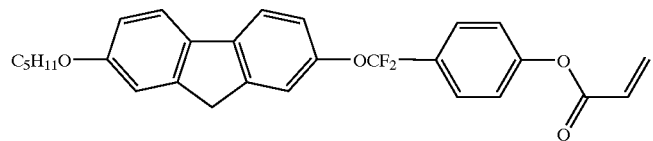
No. 25
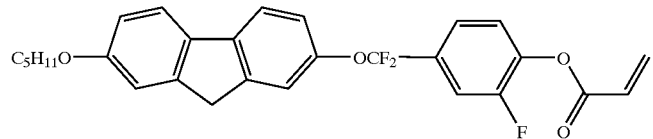
No. 26
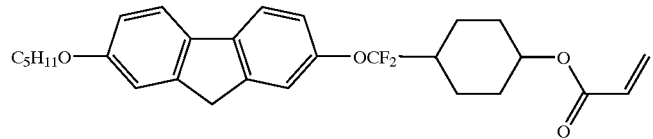
No. 27
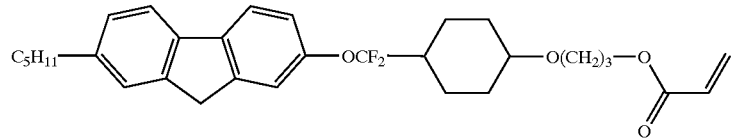
No. 28
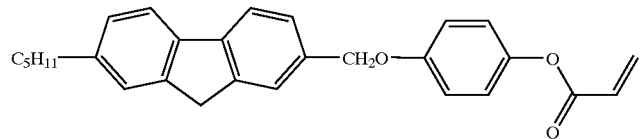
No. 29
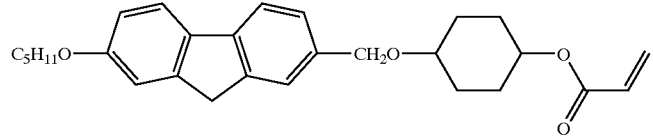
No. 30
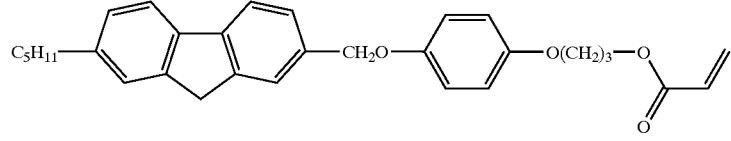
No. 31
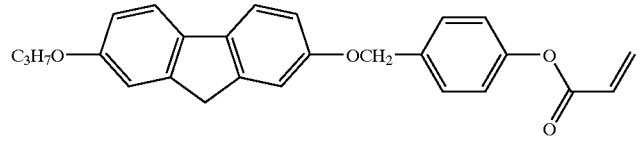
No. 32
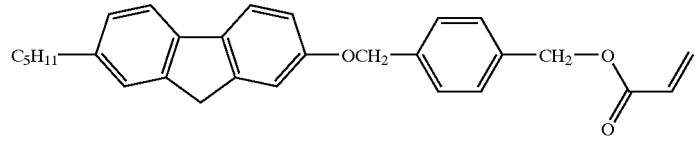
No. 33
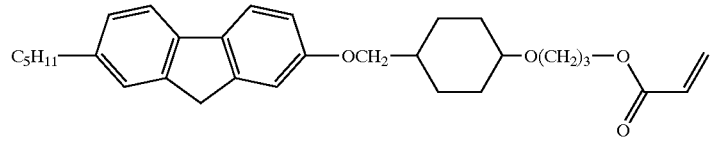
No. 34

-continued
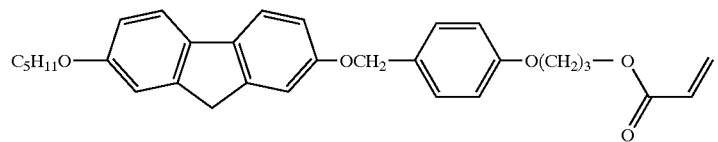
No. 35
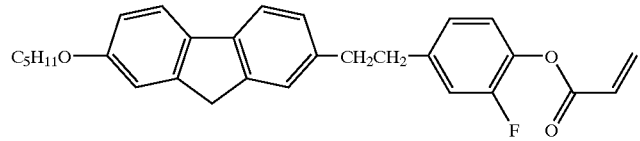
No. 36
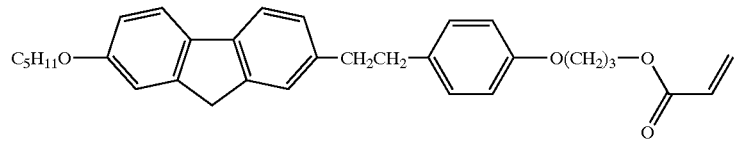
No. 37
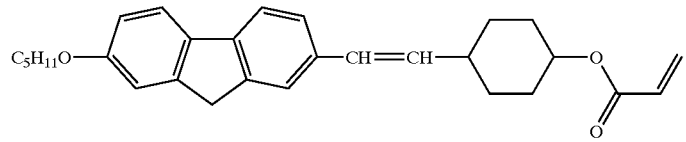
No. 38
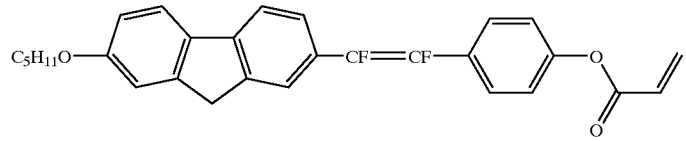
No. 39
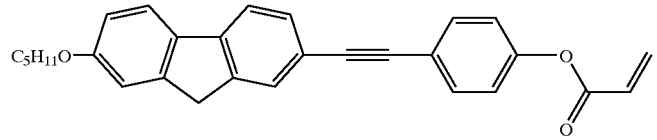
No. 40
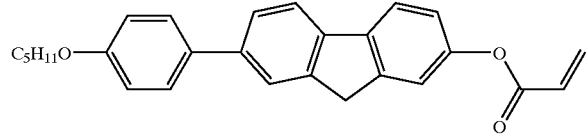
No. 41
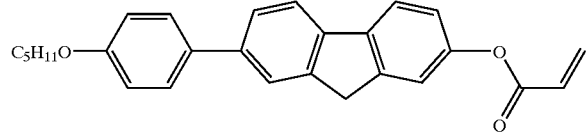
No. 42
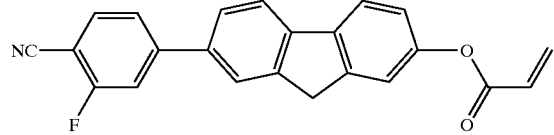
No. 43
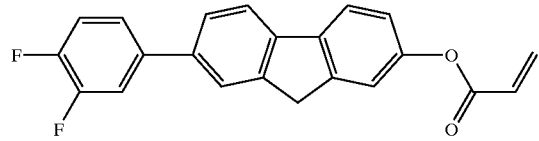
No. 44

-continued
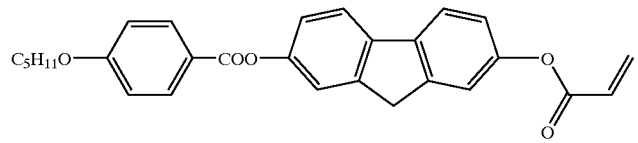
No. 45
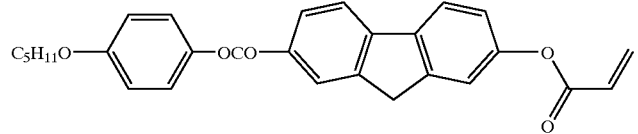
No. 46
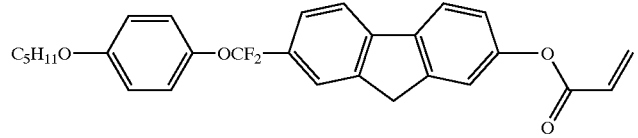
No. 47
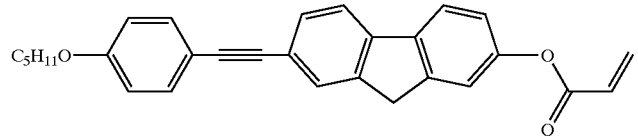
No. 48
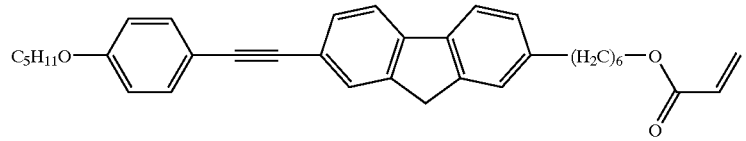
No. 49
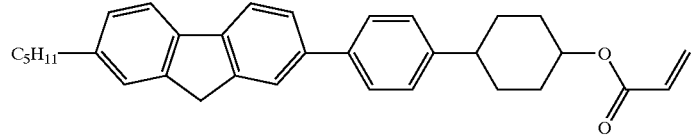
No. 50
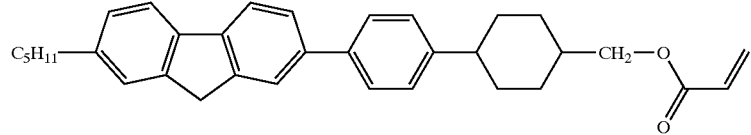
No. 51
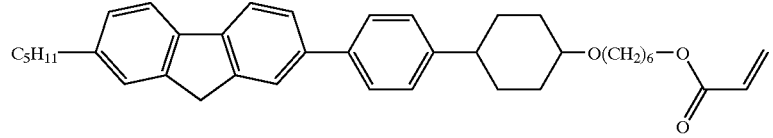
No. 52
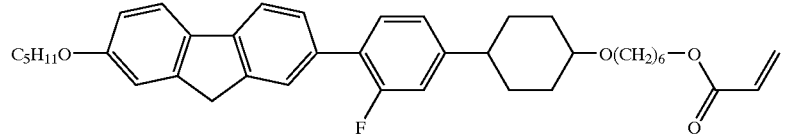
No. 53
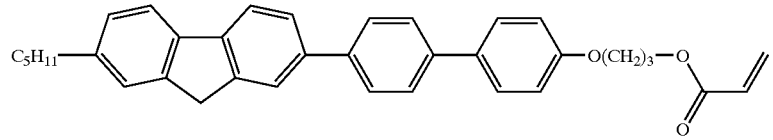
No. 54

No. 55
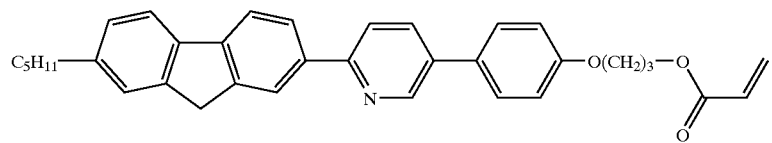
No. 56
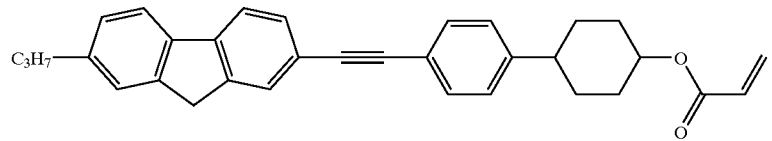
No. 57
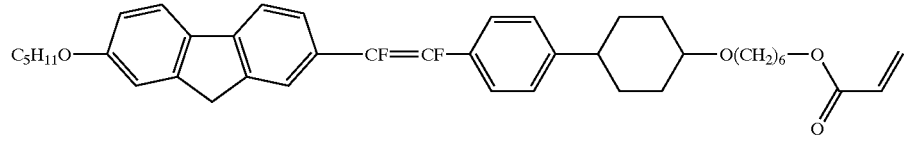
No. 58
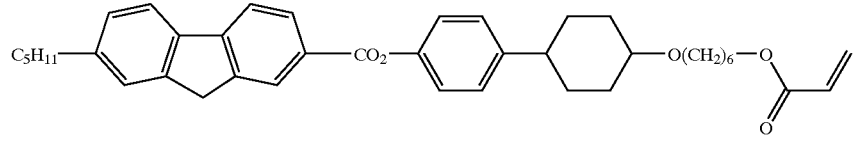
No. 59
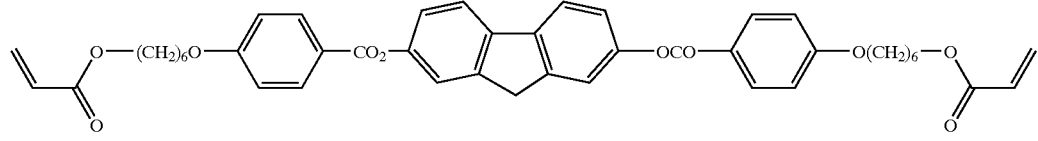
No. 60
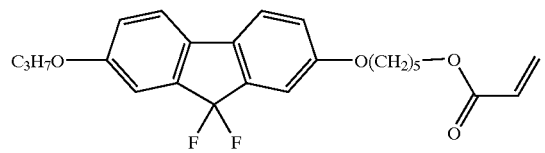
No. 61
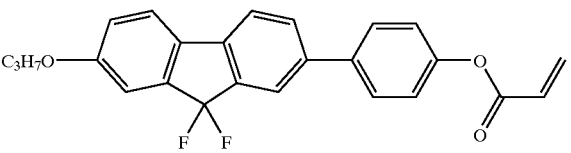
No. 62
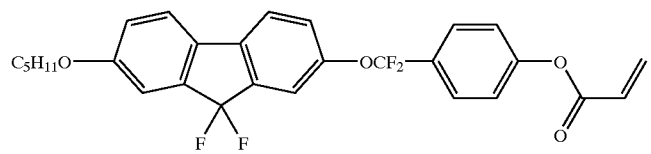
No. 63
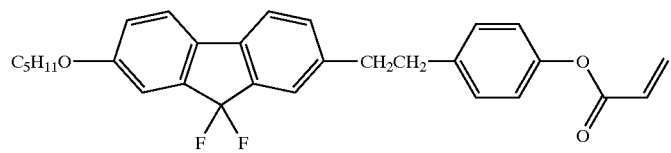
No. 64
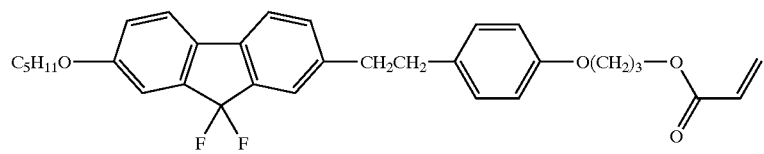
No. 65
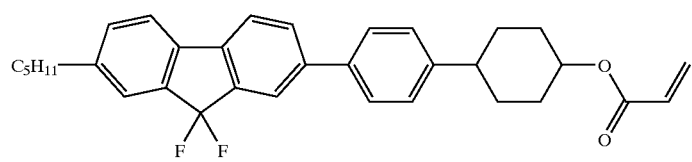

-continued
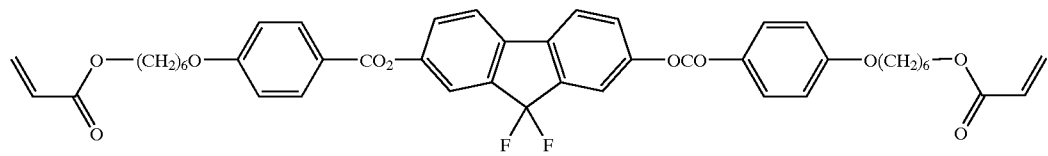
No. 66
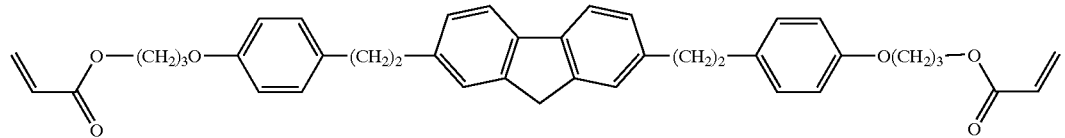
No. 67
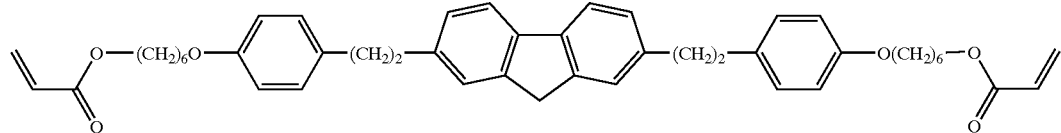
No. 68
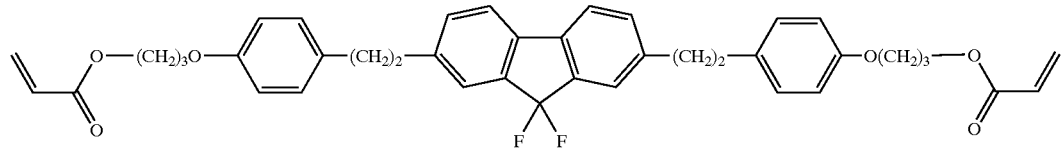
No. 69
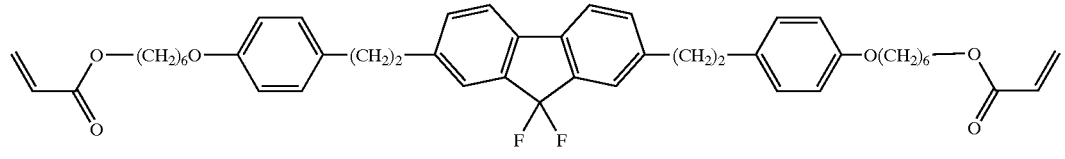
No. 70
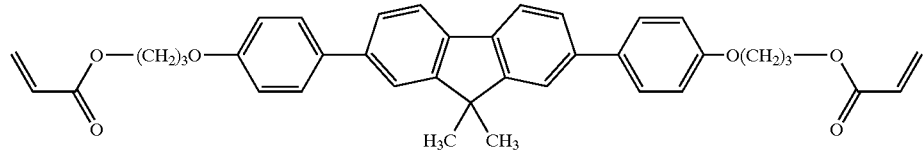
No. 71
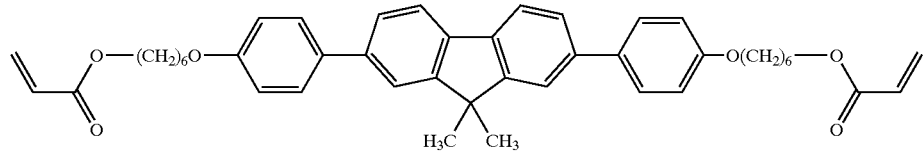
No. 72
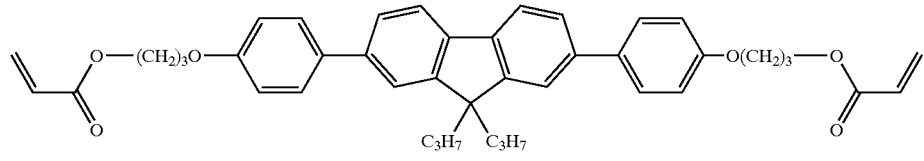
No. 73
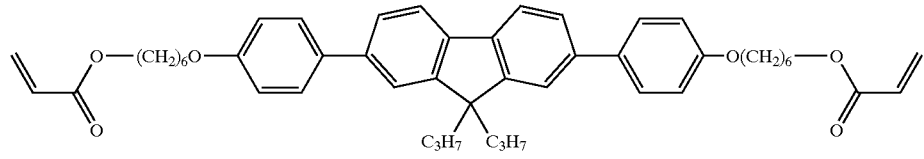
No. 74
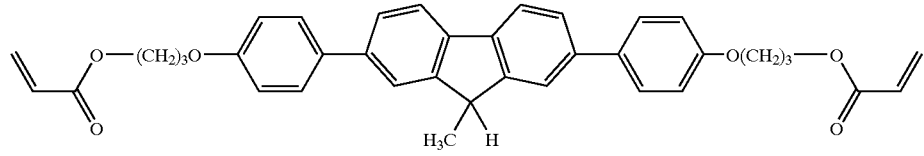
No. 75

-continued
No. 76
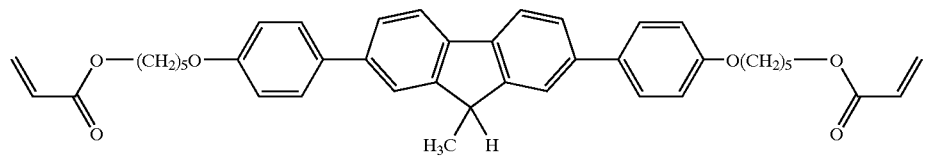
No. 77
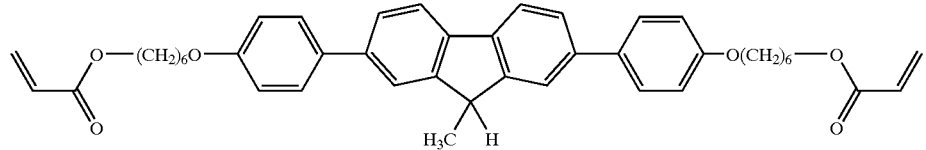
No. 78
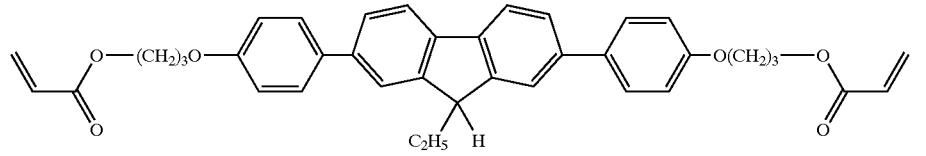
No. 79
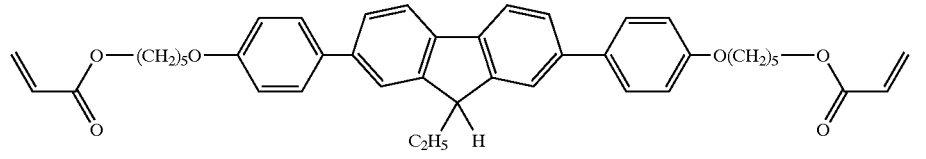
No. 80
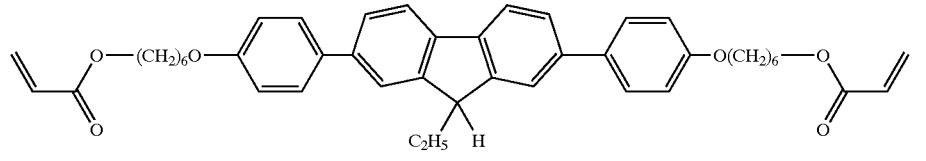
No. 81
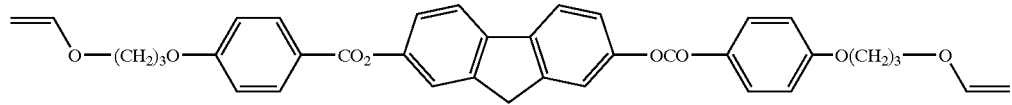
No. 82
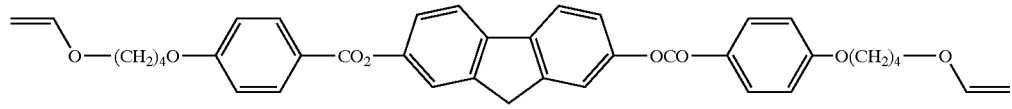
No. 83
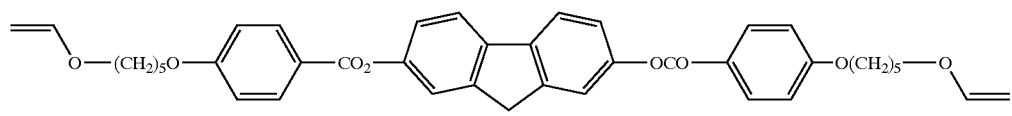
No. 84
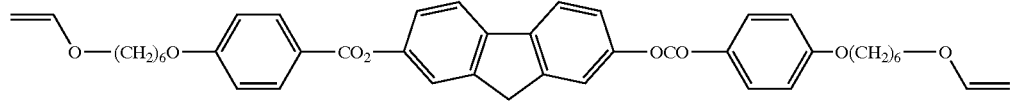
No. 85
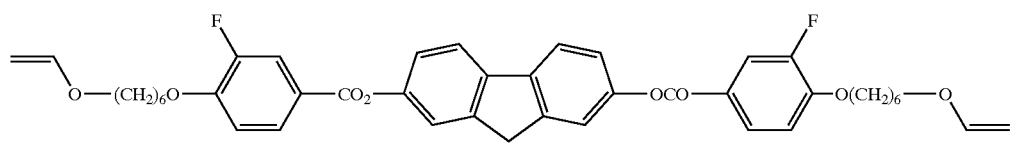
No. 86
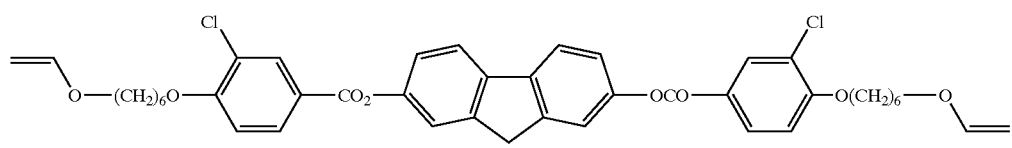

-continued
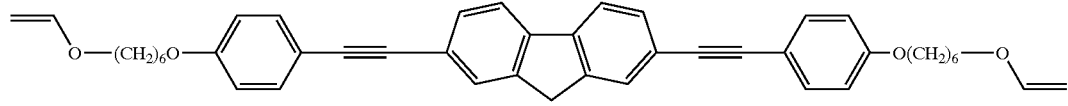
No. 87
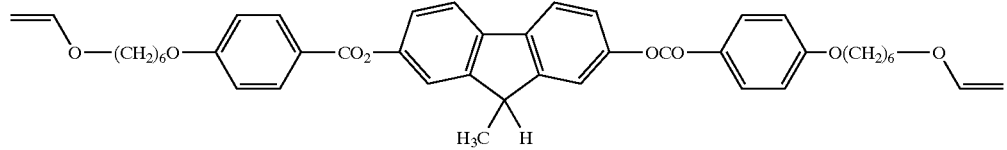
No. 88
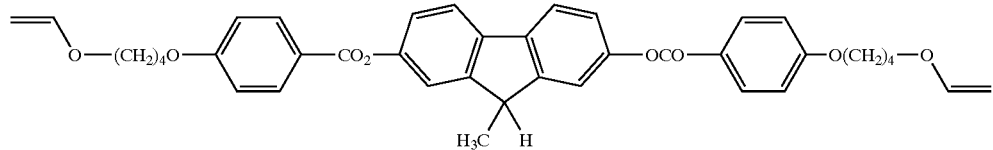
No. 89
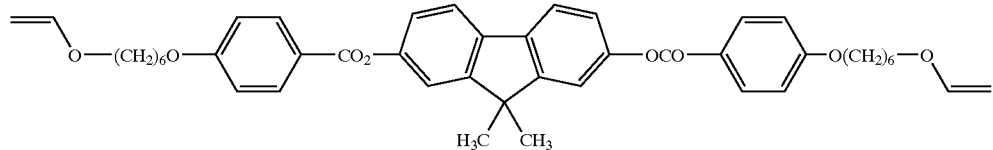
No. 90
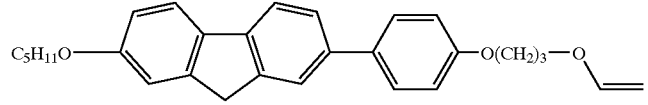
No. 91
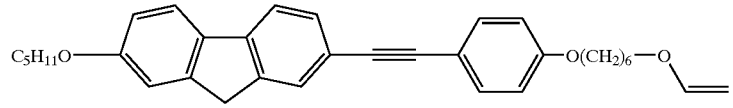
No. 92
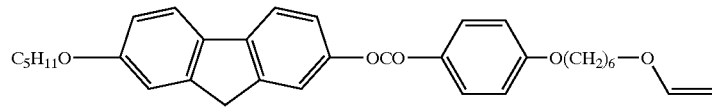
No. 93
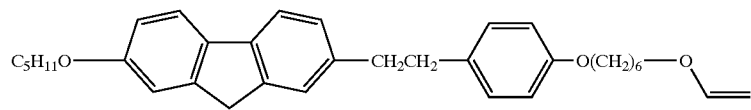
No. 94
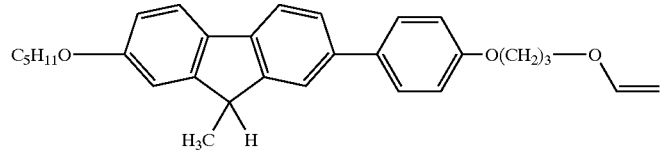
No. 95
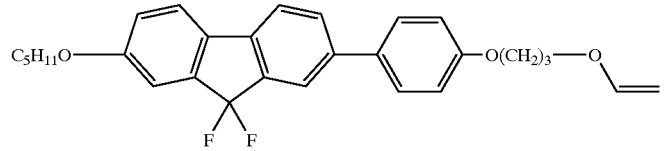
No. 96
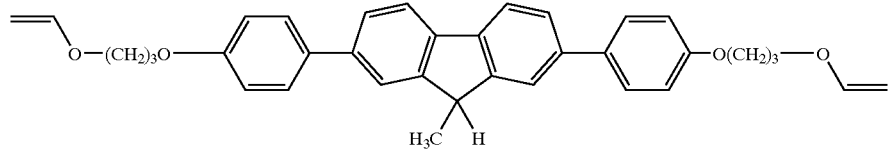
No. 97

-continued
No. 98
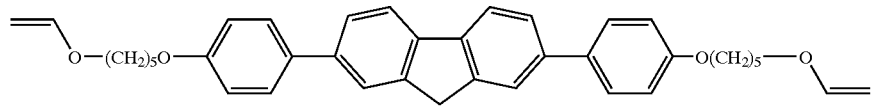
No. 99
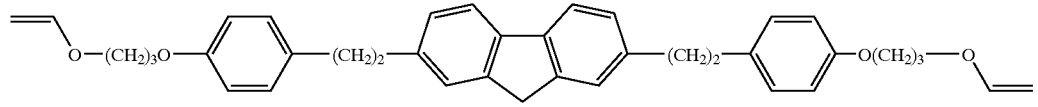
No. 100
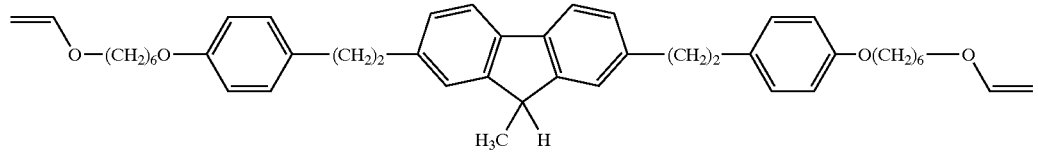
No. 101
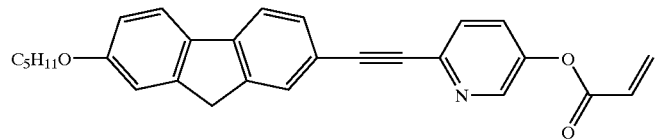
No. 102
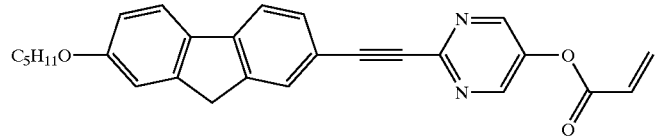
No. 103
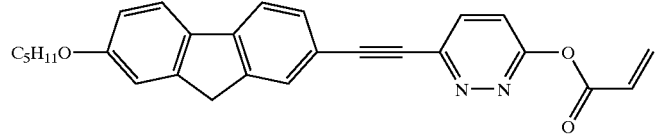
No. 104
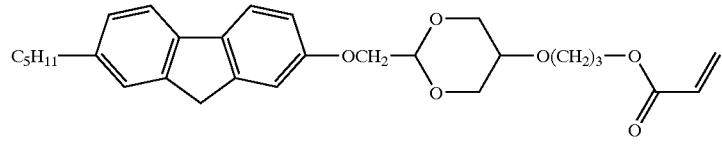
No. 105
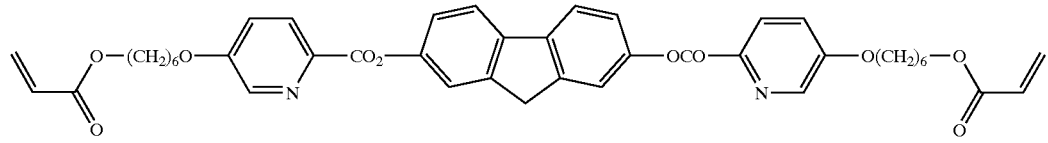
No. 106
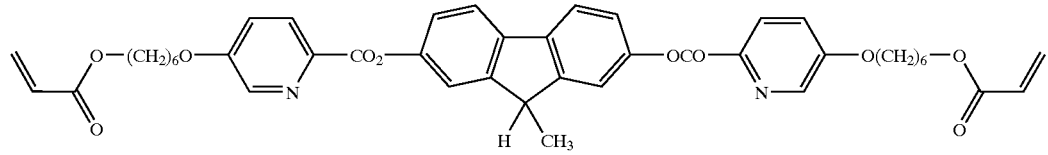
No. 107
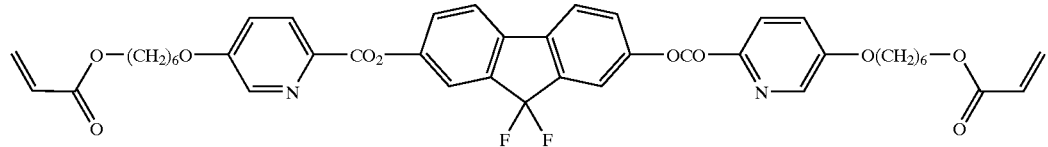
No. 108
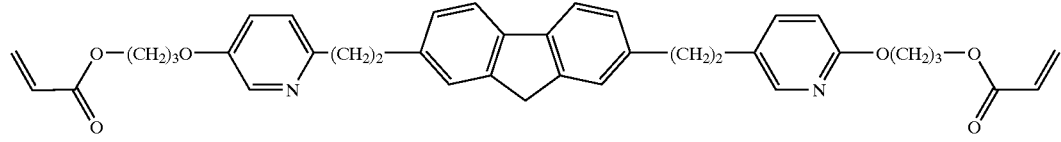

-continued

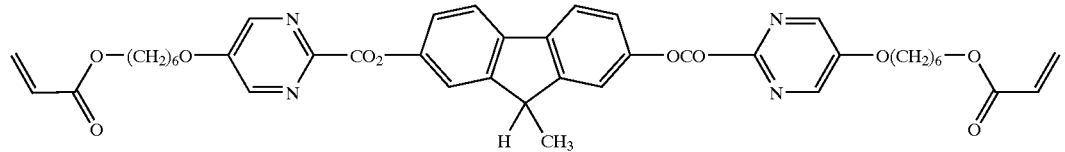
No. 109

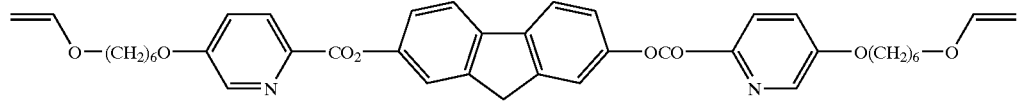
No. 110

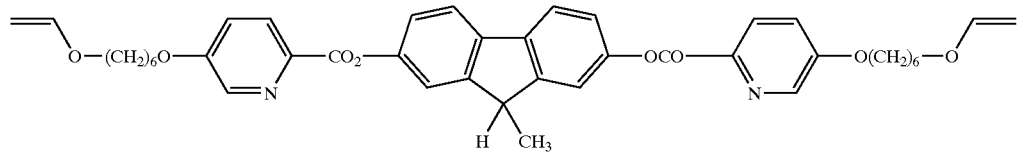
No. 111

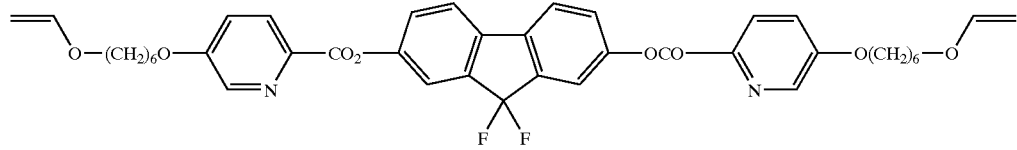
No. 112

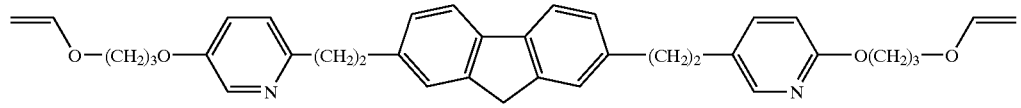
No. 113

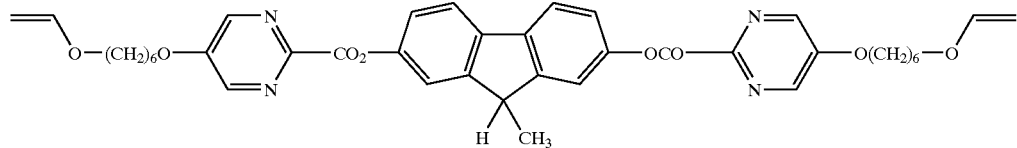
No. 114

The compound (1) shows high characteristics as liquid crystal such as a wide temperature range of a liquid crystal phase and a suitable compatibility with the other liquid crystalline compounds. Accordingly, at least one of the compounds (1) which is combined with the other liquid crystalline compounds can be used as it is for a display device as a liquid crystalline composition. In this case, polymerizable compounds can be used as the other liquid crystalline compounds. The compound (1) is useful for improving a birefringence factor of a liquid crystal composition and a compatibility at a low temperature. Also, this composition can be polymerized according to the purposes. Another composition of the present invention is a polymerizable composition comprising at least one of the compounds (1) and the other monomers. The polymerizable composition preferably shows a liquid crystal phase but may not show a liquid crystal phase depending on the purposes. Explanation regarding this polymerizable composition is included in subsequent explanation regarding the polymer.

The polymer of the present invention is a polymer comprising at least one kind of the structural units represented by Formula (3):

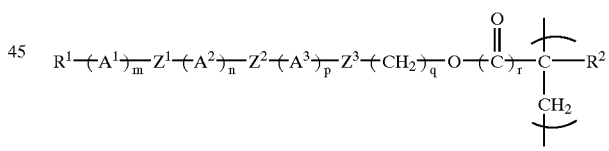

(3)

The structural unit represented by Formula (3) has a chemical structure in which a double bond at an end of the compound (1) is opened. Accordingly, the symbols in Formula (3) mean just the same as those in Formula (1). $R^2$ in Formula (3) is preferably hydrogen rather than methyl from the viewpoint of easiness in polymerization.

The example of the structural unit in which $R^1$ is a group having (meth)acryloyloxy or vinyloxy is a structural unit represented by Formula (3-1):

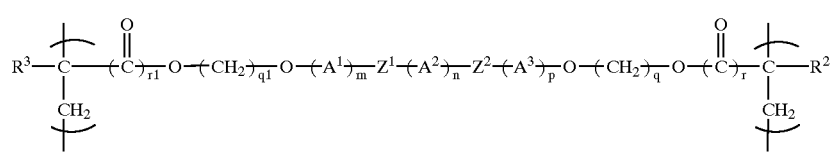

(3-1)

wherein $A^1$ to $A^3$, m, n, p, $R^2$, $Z^1$, $Z^2$ and r mean the same as those in Formula (1); q and q1 are independently an integer of 2 to 10; $R^3$ is hydrogen or methyl; and r1 is 0 or 1.

A homopolymer can be prepared from the compound (1) by homopolymerization. Also, a plurality of different kinds of the compounds (1) can be used for copolymerization. Further, a copolymer may be prepared by polymerizing a polymerizable composition comprising at least one of the compounds (1) and the other monomers. The other monomers shall not specifically be restricted as long as they do not reduce the film-forming property and the mechanical strength and can be copolymerized with the compound (1). The other monomers may or may not show a liquid crystallinity.

The examples of the other monomers showing no liquid crystallinity are vinyl esters, aromatic vinyl compounds, α-substituted styrene compounds, halogen nucleus-substituted styrenes, vinyl ethers, alkyl vinyl ketones, (meth)acrylates, olefins, dienes, alkyl itaconates, N-vinylacetamide and α,β-vinylnaphthalene. The specific examples of the vinyl esters are vinyl acetate, vinyl pivalate, vinyl 2,2-dimethylbutanoate, vinyl 2,2-dimethylpentanoate, vinyl 2-methyl-2-butanoate, vinyl propionate, vinyl stearate and vinyl 2-ethyl-2-methylbutanoate. The specific examples of the aromatic vinyl compounds are vinyl p-tert-butylbenzoate, vinyl N,N-dimethylaminobenzoate and vinyl benzoate. The specific examples of the α-substituted styrene compounds are styrene, o-chloromethylstyrene, m-chloromethylstyrene, p-chloromethylstyrene, α-methylstyrene and nucleus-substituted products thereof. The specific examples of the halogen nucleus-substituted styrenes are o-chlorostyrene, m-chlorostyrene and p-chlorostyrene. The specific examples of the vinyl ethers are ethyl vinyl ether, hydroxybutyl monovinyl ether, tert-amyl vinyl ether and cyclohexanedimethanolmethyl vinyl ether. The specific examples of the alkyl vinyl ketones are methyl vinyl ketone and isobutyl vinyl ketone. The specific examples of the (meth)acrylates are methyl (meth)acrylate, ethyl (meth)acrylate, butyl (meth)acrylate, 2-ethylhexyl (meth)acrylate and phenyl (meth)acrylate. The specific examples of the olefins are propene, vinyl chloride and vinyl fluoride. The specific examples of the dienes are butadiene and isoprene. The specific examples of the alkyl itaconates are dimethyl itaconate, diethyl itaconate, dibutyl itaconate and diisopropyl itaconate.

Among the other monomers, the specific examples of the compounds showing a liquid crystallinity are liquid crystalline acrylic acid derivatives such as the compounds (a) to (c) described above. The acrylic acid compounds are suited since they provide polymers which are transparent and have a high mechanical strength. The liquid crystalline acrylic acid derivatives can be used as well in order to control a temperature range of a liquid crystal phase of the polymerizable composition. The copolymer obtained from the polymerizable composition comprising at least one of the compounds (1) may be any of a random copolymer, an alternate copolymer, a block copolymer and a graft copolymer.

A polymer prepared by heat polymerization can be applied to various protective films and liquid crystal aligning films. In photopolymerization, polymerizable molecules can be polymerized in the state that they are arranged in a direction of polarized light by using polarized light, particularly polarized UV light. Accordingly, a polymer obtained by photopolymerization can be applied to aligning films requiring no rubbing, in addition to various protective films and liquid crystal aligning films. The polymer of the present invention has an optical anisotropy and therefore can be used alone as a retardation film or applied to a polarizer, a circular polarizer, an elliptic polarizer, a anti-reflection film, a color compensation plate and a viewing angle compensation plate by combining with the other retardation film.

The retardation film is obtained by applying a composition obtained by adding an optimum amount of an optically active compound to the compound (1) on a substrate subjected to aligning treatment and polymerizing it. The texture of the composition containing the compound (1) shows a helical structure by adding the optically active compound. This helical structure is fixed by polymerization of the compound (1), and a retardation film is formed. The characteristics of the retardation film depends on a pitch length of the resulting helical structure. This pitch length can be controlled by the kind and the addition amount of the optically active compound. This addition amount is usually 0.01 to 10% by weight, preferably 0.01 to 5% by weight. One optically active compound may be added. Plural optically active compounds may be added for the purpose of offsetting a temperature dependency of the pitch length. Further, a monomer other than the compound (1) may be contained in addition to this compound (1) and the optically active compound.

In order to produce the polymer of the present invention, a polymerizing method suited to the uses thereof is preferably selected. In producing an optically anisotropic film such as a retardation film and a polarizer, it is required to quickly carry out polymerization in the state that the liquid crystal state is maintained, and therefore preferred is a polymerizing method in which energy such as a UV ray or an electron beam is irradiated. In this case, the compound (1) is polymerized with the other monomer which is an optional component, in the presence of a photoradical polymerization initiator. The examples of the photoradical polymerization initiator are 2-hydroxy-2-methyl-1-phenylpropane-1-one, 1-hydroxycyclohexyl phenyl ketone, 1-(4-isopropylphenyl)-2-hydroxy-2-methylpropane-1-one, benzyl dimethyl ketal and a mixture of 2-methyl-1-[4-(methylthio)phenyl]-2-morpholinopropane-1,2,4-diethylxanthone and methyl p-dimethylaminobenzoate.

Heat polymerization is preferred for producing an aligning film, a anti-reflection film and a viewing angle compensation plate. In heat polymerization, the compound (1) is polymerized with the other monomer which is an optional component at a reaction temperature of 0 to 150° C. for 1 to 100 hours in the presence of a radical polymerization initiator. The examples of the radical polymerization initiator are benzoyl peroxide, diisopropyl peroxydicarbonate, t-butyl peroxy-2-ethylhexanoate, t-butyl peroxypivalate, t-butyl peroxydiisobutyrate, lauroyl peroxide, dimethyl 2,2'-azobisisobutyrate (MAIB), azobisisobutyronitrile (AIBN) and azobiscyclohexanecarbonitrile (CAN).

In this heat polymerization, a solvent can be used. The solvent may be one usually used in heat polymerization. The preferred solvents are benzene, toluene, xylene, hexane, heptane, octane, nonane, decane, tetrahydrofuran and N-methylpyrrolidone. It is not meaningful so much to restrict a use proportion of the solvent in polymerization. The reasons are that the required polymer concentration is different depending on the uses of the polymer and that this concentration can be controlled by dilution after the polymerization. A used proportion of the solvent in the polymerization may be decided by every individual case considering economical viewpoints such as a polymerization efficiency, a solvent cost and an energy cost. These solvents can be used as well in photopolymerization. In producing an aligning film, a anti-reflection film and a viewing angle compensation plate by photopolymerization, it is preferred to apply a solution obtained by dissolving the compound (1) or the polymerizable composition on a substrate by spin coating, and irradiate it with light after removing the solvent to polymerize it.

EXAMPLES

The present invention shall be explained in further details with reference to examples, but the present invention shall not be restricted by these examples.

In a phase transition temperature described in the examples, C shows a melting point; SmA shows a smectic A phase; N shows a nematic phase; and I shows isotropic liquid. The unit of the phase transition temperature is ° C.

The weight average molecular weight and the number average molecular weight were measured by means of Shimadzu LC-9A type gel permeation chromatograph (GPC) manufactured by Shimadzu Seisakusho Co., Ltd. using a column Shodex GF-7M HQ manufactured by Showa Denko Co., Ltd. In this case, dimethylforamide (DMF) or tetrahydrofuran (THF) was used for a developing solvent.

The pencil hardness was determined according to a method described in JIS Standard 'JIS-K-5400 8.4 pencil scratch test'.

The units of liter and milliliter were shown by L and mL.

1-Ethyl-3-(3-dimethylaminopropyl)carbodiimide was shown by a code EDC. 4-Dimethylaminopyridine was shown by a code DMAP.

Example 1
<Production of 2-pentyloxy-7-(2-(3-fluoro-4-acryloyloxyphenyl)ethyl)fluorene (Compound No. 36)>

No.36

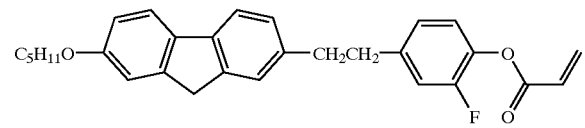

(First step) production of 2-acetylfluorene

A dichloromethane (1 L) solution of fluorene (150 g) was cooled down to 0° C., and anhydrous aluminum chloride (126 g) was added thereto little by little. Next, a dichloromethane (400 mL) solution of acetyl chloride (74 g) was dropwise added and stirred for one hour while maintaining 0° C. The reaction mixture was poured into 6M-hydrochloric acid (1 L) containing ice, and the solid matters deposited were obtained by filtering under reduced pressure. They were dried and then recrystallized from toluene to obtain 2-acetylfluorene (165 g) of colorless needle crystal. The melting point of this compound was 129° C.

(Second step) production of 2-acetoxyfluorene

Sulfuric acid (40 mL) was added to a mixture of 2-acetylfluorene (165 g), formic acid (320 g), acetic anhydride (120 g) and dicholoromethane (1 L), and then aqueous hydrogen peroxide (120 mL) was dropwise added thereto. The solution was stirred for 30 minutes at a room temperature, and it was heated up to 40° C. and further stirred for 5 hours. Water (1 L) was added to the reaction mixture, and the dichloromethane layer was separated. The dichloromethane layer was washed in order with a saturated sodium carbonate aqueous solution, a sodium hydrogensulfite aqueous solution and water, and then it was dried on anhydrous magnesium sulfate and concentrated to obtain a solid matter. This was recrystallized from a mixed solvent of heptane-ethyl acetate (1:1) to obtain 2-acetoxyfluorene (149 g) of colorless needle crystal. The melting point was 130 C.

(Third step) production of 2-bromo-7-acetoxyfluorene

2-Acetoxyfluorene (70 g) was added to a mixture of acetic acid (330 mL) and acetic anhydride (110 mL) and heated up to 65° C. to obtain a homogeneous solution. Bromine (125 g) was dropwise added thereto in 40 minutes and stirred for further one hour. The reaction solution was poured into water (1 L) to obtain deposited crystals by filtration under reduced pressure. The dried crystals were ecrystallized from a mixed solution of ethanol (400 mL) and ethyl acetate (300 mL) to obtain colorless needle-shaped 2-bromo-7-acetoxyfluorene (69 g). The melting point of this compound was 130° C.

(Fourth step) production of 2-bromo-7-hydroxyfluorene

A mixture of 2-bromo-7-acetoxyfluorene (69 g), lithium hydroxide (9 g) and ethylene glycol (350 mL) was heated for one hour while refluxing. The reaction mixture was poured into 6M-hydrochloric acid (300 mL) to terminate the reaction, and the product was extracted with ethyl acetate (350 mL). The ethyl acetate layer was washed with a saturated sodium carbonate aqueous solution and dried on anhydrous magnesium sulfate. A residue obtained by distilling the solvent off under reduced pressure was recrystallized from chloroform to obtain 2-bromo-7-hydroxyfluorene (40 g) of colorless needle crystal. The melting point was 183–184° C.

(Fifth step) production of 2-bromo-7-pentyloxyfluorene

A mixture of 2-bromo-7-hydroxyfluorene (18 g), pentyl bromide (15.1 g), potassium carbonate (26.6 g) and dimethylformamide (200 mL) was heated for 3 hours while refluxing. 6M-hydrochloric acid (100 mL) was added to the reaction solution, and the solution was extracted with toluene. The toluene layer was washed with water and then dried on anhydrous magnesium sulfate, and it was concentrated under reduced pressure. This concentrate was recrystallized from acetone to obtain 2-bromo-7-pentyloxyfluorene (20 g) of colorless needle crystal.

(Sixth step) production of 2-pentyloxy-7-ethynylfluorene

A mixture of 2-bromo-7-pentyloxyfluorene (12 g), trimethylsilylacetylene (7.1 g), dichlorobis(triphenylphosphine) palladium (0.3 g), copper iodide (0.08 g), triphenylphosphine (0.2 g) and triethylamine (200 mL) was heated for 3 hours while refluxing. Insoluble matters were removed from the reaction mixture by filtration, and triethylamine was distilled off under reduced pressure. The residue was purified by means of column chromatography (silica gel, eluting solvent: toluene) to obtain 6.5 g of 2-pentyloxy-7-trimethylsilylethynylfluorene. This was dissolved in tetrahydrofuran (100 mL) and cooled down to −60° C. on a dry ice-acetone bath. A 1M solution (46 mL) of tetraethylammonium fluoride was added thereto, and then the dry ice-acetone bath was removed, followed by stirring the solution until the temperature came up to −10° C. At a point of time when −10° C. was reached, water (30 mL) was added and stirred until the temperature came up to a room temperature, and then water was further added to terminate the reaction. The product was extracted with toluene, and the toluene layer was dried on anhydrous magnesium sulfate. A residue obtained by distilling the solvent off was purified by means of column chromatography (silica gel, eluting solvent: toluene). Then, it was recrystallized from ethanol to obtain 2-pentyloxy-7-ethynylfluorene (5 g) of colorless needle crystal. The melting point of this compound was 108° C.

(Seventh step) production of 2-pentyloxy-7-(2-(3-fluoro-4-benzyloxyphenyl)ethynyl)fluorene Charged were 2-pentyloxy-7-ethynylfluorene (2.4 g), 4-boromo-2-fluorobenzyloxybenzene (2.5 g), dichlorobis (triphenylphosphine)palladium (0.07 g), copper iodide (0.02 g), triphenylphosphine (0.05 g) and triethylamine (150 mL), and the mixture was heated for 3 hours while refluxing. Insoluble matters were removed from the reaction mixture by filtration, and triethylamine was distilled off under reduced pressure. The residue was purified by means of column chromatography (silica gel), and recrystallization from acetone was repeated twice to obtain 2-pentyloxy-7-[2-(3-fluoro-4-benzyloxyphenyl)ethynyl]fluorene (1 g). This showed a liquid crystal phase and had the following phase transition temperature:

C 143 SmA 190 N 224 I.

(Eighth step) production of 2-pentyloxy-7-(2-(3-fluoro-4-hydroxyphenyl)ethyl)fluorene 2-Pentyloxy-7-[2-(3-fluoro-4-benzyloxyphenyl)ethynyl] fluorene (1 g) and palladium on carbon (0.02 g) were stirred in tetrahydrofuran (30 mL) at an atmospheric pressure under hydrogen atmosphere. Absorption of hydrogen was stopped after 2 hours, and therefore the reaction mixture was filtered to remove the catalyst, followed by distilling the solvent off. The residue was recrystallized twice from acetone to obtain 2-pentyloxy-7-(2-(3-fluoro-4-hydroxyphenyl)ethyl)fluorene (0.7 g) of colorless needle crystal.

(Ninth step) production of 2-pentyloxy-7-(2-(3-fluoro-4-acryloyloxyphenyl)ethyl)fluorene 2-Pentyloxy-7-(2-(3-fluoro-4-hydroxyphenyl)ethyl) fluorene (0.7 g) and acrylic acid (0.14 g) were dissolved in chloroform (30 mL) and cooled down to 0° C. 1-Ethyl-3-(3-dimethylaminopropyl)carbodiimide hydrochloride (0.44 g) and 4-dimethylaminopyridine (0.01 g) were added thereto, and then the temperature was allowed to come back to a room temperature, followed by stirring for 24 hours. Water was added to separate the solution, and the chloroform layer was dried on anhydrous magnesium sulfate. A residue obtained by distilling chloroform off was purified by means of column chromatography (silica gel, eluting solvent: toluene), and it was further recrystallized to obtain 2-pentyloxy-7-(2-(3-fluoro-4-acryloyloxyphenyl)ethyl) fluorene (0.14 g) of the intended product.

The phase transition temperature and the data by NMR analysis of this compound are shown below.

C 118 SmA 142.4 I.

$^1$H-NMR (CDCl$_3$): δ (ppm); 0.81–1.95(m, 9H), 2.98(s, 4H), 3.80(s, 2H), 4.01(t, 2H), 5.96–6.60(m, 3H), 6.83–7.72 (m, 9H).

Example 2

<Production of 2-pentyloxy-7-(2-(4-acryloyloxyphenyl) ethyl)-9,9-difluorofluorene (Compound No. 63)>

No. 63

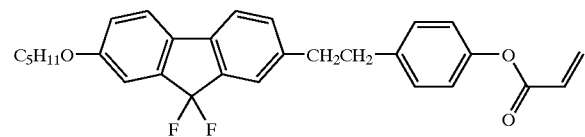

(First step) production of 4-(2-(2-pentyloxyfluorene-7-yl) ethyl)phenyl acetate

Acetic anhydride (5 mL) was slowly added to a mixture of 4-(2-(2-pentyloxyfluorene-7-yl)ethyl)phenol (5 g) produced according to the first to ninth steps in Example 1 and pyridine (100 mL) while maintaining 0° C., and the solution was stirred at the same temperature for 2 hours. The reaction mixture was poured into ice and water (200 mL), and the product was extracted with toluene (50 mL). The toluene layer was dried on anhydrous magnesium sulfate, and the solvent was distilled off under reduced pressure. The resulting residue was purified by means of column chromatography (silica gel, eluting solvent: toluene) to obtain 4-(2-(2-pentyloxyfluorene-7-yl)ethyl)phenyl acetate (5.1 g).

(Second step) production of 4-(2-(2-pentyloxyfluorenone-7-yl)ethyl)phenyl acetate Oxygen was blown into a solution comprising 4-(2-(2-pentyloxyfluorene-7-yl)ethyl)phenyl acetate (4.2 g), powdery potassium hydroxide (1.0 g) and 2-butanone (80 mL) for one hour while refluxing by heating, and the solution was further stirred at a room temperature for one hour. A hydrochloric acid aqueous solution was added thereto, and then the product was extracted with chloroform to dry the chloroform layer on anhydrous magnesium sulfate. A residue obtained by distilling the solvent off from this organic layer was purified by means of column chromatography (silica gel, eluting solvent: toluene) to obtain 4-(2-(2-pentyloxyfluorenone-7-yl)ethyl)phenyl acetate (2.3 g).

(Third step) production of 4-(2-(2-pentyloxyfluorenone-7-yl)ethyl)phenyl acetate ethylenedithioketal A solution prepared by dissolving 4-(2-(2-pentyloxyfluorenone-7-yl)ethyl)phenyl acetate (2.0 g) and ethanedithiol (1 mL) in dichloromethane (35 mL) was cooled down to 0° C., and a boron trifluoride diethyl ether complex (2 mL) was added thereto. The temperature was elevated up to a room temperature to stir the solution for 6 hours, and then a saturated sodium carbonate aqueous solution was added thereto. The dichloromethane layer was separated and then dried on anhydrous magnesium sulfate, and it was purified by means of column chromatography using toluene to obtain 4-(2-(2-pentyloxyfluorenone-7-yl) ethyl)phenyl acetate ethylenedithioketal (1.5 g).

(Fourth step) production of 4-(2-(2-pentyloxy-9,9-difluorofluorene-7-yl)ethyl)phenyl acetate A dichloromethane (20 mL) solution of NIS (N-iodosuccinimide, 1.48 g) was cooled down to −70° C., and a 70% hydrogen fluoride.pyridine complex (3 mL) was dropwise added thereto. The internal temperature was elevated up to −30° C., and then dropwise added was a dichloromethane (10 mL) solution of 4-(2-(2-pentyloxyfluorenone-7-yl)ethyl)phenyl acetate ethylenedithioketal (1.5 g). The solution was stirred at −30° C. for 30 minutes, and then the reaction mixture was poured into a saturated sodium carbonate aqueous solution to terminate the reaction. The product was extracted with dichloromethane, and the dichloromethane layer was dried on anhydrous magnesium sulfate. A residue obtained by distilling the solvent off from this organic layer was purified by means of column chromatography (silica gel, eluting solvent: toluene), and it was further recrystallized to obtain 4-(2-(2-pentyloxy-9,9-difluorofluorene-7-yl)ethyl)phenyl acetate (1.1 g).

(Fifth step) production of 2-pentyloxy-7-(2-(4-acryloyoxyphenyl)ethyl)-9,9-difluorofluorene Sulfuric acid (3 drops) was added to a mixture of 4-(2-(2-pentyloxy-9,9-difluorene-7-yl)ethyl)phenyl acetate (1.0 g) and methanol (30 mL), and the mixture was stirred at 50° C. for 5 hours. Methanol was removed at a room temperature under reduced pressure, and the residue was purified by means of column chromatography (silica gel, eluting solvent: toluene) to obtain 4-(2-(2-pentyloxy-9,9-difluorofluorene-7-yl)ethyl)phenol (0.65 g). This compound was converted to acrylate according to the method of the ninth step in Example 1 to obtain 2-pentyloxy-7-(2-(4-acryloyoxyphenyl)ethyl)-9,9-difluorofluorene (0.44 g). A phase transition temperature of this compound is shown below.

C 118 SmA 142.4 I.

Example 3
<Production of 2,7-bis(4-(6-acryloyloxyhexyl)-oxybenzoyloxy)fluorene (Compound No. 59)> acid (1 L) to deposit 2,7-dihydroxyfluorene (3.4 g) in the form of a brown solid matter. Melting point: 261.1–265.4° C.
(Fourth step) production of 2,7-bis(4-(6-acryloyloxyhexyl) oxybenzoyloxy)fluorene A mixture of 2,7-dihydroxyfluorene (0.5 g), 4-(6-acryloyloxyhexyloxy)benzoic acid (1.62 g), EDC (1.06 g), DMAP (6.16 mg) and dichloromethane (30 mL) was stirred at a room temperature for 12 hours. Water was added to the

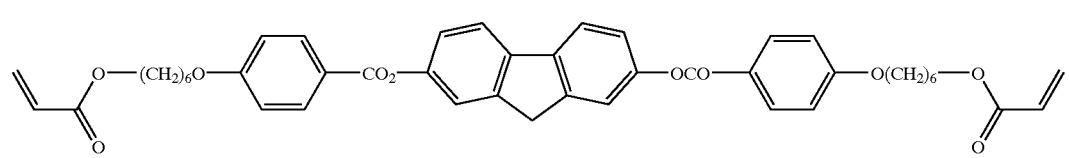

No. 59

(First step) production of 2-acetyl-7-acetoxyfluorene

Acetic anhydride (50 mL) was added to a mixture of 2-acetyl-7-hydroxyfluorene (50 g), pyridine (200 mL) and THF (200 mL) at 28° C. The temperature was elevated slowly up to 61° C. by exothermic heat to obtain a yellow transparent reaction mixture. An organic layer obtained by extracting the mixture with chloroform was washed well in order with 3M-hydrochloric acid, saturated sodium hydrogencarbonate and water, and then dried on anhydrous magnesium sulfate. The solvent was distilled off from this organic layer under reduced pressure, and the resulting residue was purified by means of column chromatography (silica gel, eluting solvent: toluene) and recrystallization (ethanol/ethyl acetate) to obtain 2-acetyl-7-acetoxyfluorene (47.3 g) of colorless crystal. Melting point: 125.5–127.6° C.
(Second step) production of 2,7-diacetyloxyfluorene Acetic anhydride (26.2 g) and 88% formic acid (68 g) were added in order to a mixture of 2-acetyl-7-acetoxyfluorene (45 g) and dichloromethane (450 mL). 36M-sulfuric acid (9 mL) was slowly added thereto at 9° C., and then a 34% hydrogen peroxide aqueous solution (25.9 g) was added to obtain a ocherous reaction mixture. This reaction mixture was refluxed for 9 hours by heating, and then it was cooled down to a room temperature and poured into water. The mixture was neutralized with saturated sodium hydrogencarbonate, and then the organic layer was sufficiently washed with 10% sodium hydrogensulfite to remove unreacted peroxide. The separated organic layer was concentrated under reduced pressure, and the resulting residue was purified by means of column chromatography (silica gel, eluting solvent: ethyl acetate) to obtain 2,7-diacetyloxyfluorene (22.5 g) of colorless crystal. Melting point: 167.6–168.3° C.
(Third step) production of 2,7-dihydroxyfluorene A mixture of 2,7-diacetyloxyfluorene (5 g), lithium hydroxide (1.49 g) and ethylene glycol (50 mL) was refluxed for 6 hours by heating and then left cooling down. The resulting reaction mixture was poured into 6M-hydrochloric reaction mixture to separate an organic layer, and the resulting organic layer was washed with water and dried on anhydrous magnesium sulfate. The solvent was distilled off from this organic layer under reduced pressure, and the resulting residue was purified by means of column chromatography (silica gel, eluting solvent: toluene/ethyl acetate [95/5]) and recrystallization (ethanol/ethyl acetate/toluene) to obtain 2,7-bis(4-(6-acryloyloxyhexyl)oxybenzoyloxy) fluorene (0.42 g) of colorless crystal.

The phase transition temperature and the data by NMR analysis of this compound are shown below.

C 133 N 280<I.

$^1$H-NMR (CDCl$_3$): δ (ppm); 1.47–1.54(m, 8H), 1.72–1.75 (m, 4H), 1.83–1.86(m, 4H), 3.95(s, 2H), 4.06(t, 4H), 4.19(t, 4H), 5.82(dd, 2H), 6.12(dd, 2H), 6.40(dd, 2H), 6.97(d, 4H), 7.26(dd, 2H), 7.39(d, 2H), 7.78(dd, 2H), 8.16(d, 4H).

Example 4
<Production of 2,7-bis(4-(6-acryloyloxyhexyl)-oxybenzoyloxy)-9-methylfluorene (Compound No. 77)>

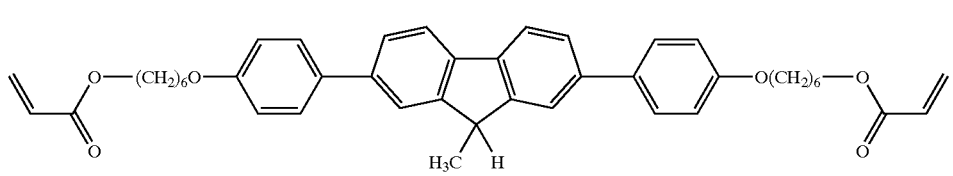

No. 77

(First step) production of 9-methylfluorene

A mixture of fluorene (78.3 g) and THF (700 mL) was cooled down to −70° C., and n-BuLi (300 mL, corresponding to 0.48 mol) was dropwise added thereto while maintaining −60° C. or lower. Then, methyl iodide (66.8 g) was added, and the temperature was allowed to slowly go back to a room temperature. The mixture was cooled again down to 0° C. to add 3M-hydrochloric acid (300 mL), and the reaction mixture was extracted with toluene. The organic layer obtained was washed well in order with saturated sodium hydrogencarbonate, saturated sodium hydrogensulfite and water, and then dried on anhydrous magnesium sulfate. The solvent was distilled off from this organic layer under reduced pressure, and the residue was purified by means of column chromatography (silica gel, eluting solvent: toluene/heptane [40/60]) and recrystallization (ethanol) to obtain 9-methylfluorene (57.4 g) of pale yellow crystal. Melting point: 47.3–48.8° C.

(Second step) production of 2,7-diacetyl-9-methylfluorene

Anhydrous aluminum chloride (162.7 g) was added to a mixture of 9-methylfluorene (55 g) and dichloromethane (800 mL) while maintaining 0° C. to obtain a deep green reaction mixture. A dichloromethane (200 mL) solution of acetyl chloride (47.9 g) was dropwise added to this mixture while maintaining 0° C., and the temperature was allowed to slowly go back to a room temperature, followed by stirring for 12 hours. The reaction mixture was poured into a mixture of 6M-hydrochloric acid and ice to separate an organic layer. This organic layer was sufficiently washed in order with saturated sodium hydrogencarbonate and water, and then dried on anhydrous magnesium sulfate. The solvent was distilled off from this organic layer under reduced pressure, and the resulting residue was purified by means of column chromatography (silica gel, eluting solvent: heptane/ethyl acetate [7/3]) and recrystallization (ethanol) to obtain 2,7-diacetyl-9-methylfluorene (30 g) of yellow crystal. Melting point: 127.9–129.0° C.

(Third step) production of 2,7-diacetyloxy-9-methylfluorene 36M-sulfuric acid (12 mL) was slowly dropwise added to a mixture of 2,7-diacetyl-9-methylfluorene (30 g), dichloromethane (30 mL), acetic anhydride (35 g) and a 34% hydrogen peroxide aqueous solution (34.6 g) while maintaining 3° C. or lower. The resulting mixture was stirred at 24° C. for 7 hours and then poured into water. The separated organic layer was sufficiently washed in order with saturated sodium hydrogencarbonate, 10% saturated sodium hydrogensulfite and water, and then dried on anhydrous magnesium sulfate. The solvent was distilled off from this organic layer under reduced pressure, and the resulting residue was purified by means of column chromatography (silica gel, eluting solvent: heptane/toluene [6/4]) and recrystallization (ethanol) to obtain 2,7-diacetyloxy-9-methylfluorene (12.4 g) of colorless crystal. Melting point: 138.6–139.7° C.

(Fourth step) production of 2,7-dihydroxy-9-methylfluorene

A mixture of 2,7-diacetyloxy-9-methylfluorene (12 g), lithium hydroxide monohydrate (3.42 g) and ethylene glycol (120 mL) was refluxed for one hour by heating. The reaction mixture was poured into 6M-hydrochloric acid and extracted with ethyl acetate. The organic layer was sufficiently washed with water and then dried on anhydrous magnesium sulfate. The solvent was distilled off from this organic layer under reduced pressure to obtain 2,7-dihydroxy-9-methylfluorene (7.24 g) of light brown crystal. Melting point: 191.5–196.3° C.

(Fifth step) production of 2,7-bis(4-(6-acryloyloxyhexyl)oxybenzoyloxy)-9-methylfluorene A mixture of 2,7-dihydroxy-9-methylfluorene (0.5 g), 4-(6-acryloyloxyhexyloxy)benzoic acid (1.52 g), EDC (0.99 g), DMAP (5.76 mg) and dichloromethane (30 mL) was stirred at a room temperature for 12 hours. Water was added to the reaction mixture, and the separated organic layer was washed with water and dried on anhydrous magnesium sulfate. The solvent was distilled off from this organic layer under reduced pressure, and the resulting residue was purified by means of column chromatography (silica gel, eluting solvent: toluene/ethyl acetate [95/5]) and recrystallization (ethanol/ethyl acetate) to obtain 2,7-bis(4-(6-acryloyloxyhexyl)oxybenzoyloxy)-9-methylfluorene (0.19 g) of a white solid matter.

The phase transition temperature and the data by NMR analysis of this compound are shown below.

C 74.7 N 280<I.

$^1$H-NMR (CDCl$_3$): δ (ppm); 1.47–1.54(m, 8H), 1.58(s, 3H), 1.72–1.75(m, 4H), 1.83–1.86(m, 4H), 4.05–4.07(m, 5H), 4.18(t, 4H), 5.82(dd, 2H), 6.12(dd, 2H), 6.40(dd, 2H), 6.97(d, 4H), 7.27(dd, 2H), 7.35(d, 2H), 7.75(dd, 2H), 8.17(d, 4H).

Example 5
<Production of 2,7-bis(4-(6-vinyloxyhexyloxy)-benzoyloxy)-9-methylfluorene (Compound No. 89)>

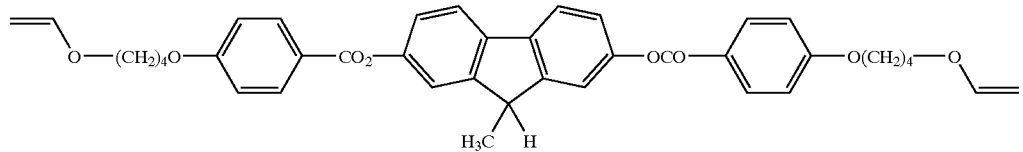

No. 89

(First step) production of 2,7-bis(4-(6-hydroxyhexyloxy)benzoyloxy)-9-methylfluorene A mixture of 2,7-dihydroxy-9-methylfluorene (2.1 g), 4-(6-hydroxyhexyl)oxybenzoic acid (4.5 g), DCC (4.1 g), DMAP (125 mg) and dichloromethane (100 mL) was stirred at a room temperature for one hour. The deposited crystals were removed by filtering, and the filtrate was concentrated. The residue was recrystallized (toluene) to obtain 2,7-bis(4-(6-hydroxyhexyloxy)benzoyloxy)-9-methylfluorene (4.9 g) of colorless crystal.

(Second step) production of 2,7-bis(4-(6-vinyloxyhexyloxy)benzoyloxy)-9-methylfluorene Diaceto(1,10-phenanthroline)palladium (0.19 g) was added to a mixture of butyl vinyl ether (70 mL) and chloroform (15 mL) and stirred at a room temperature for 10 minutes. 2,7-Bis(4-(6-hydroxyhexyloxy)benzoyloxy)-9-methylfluorene (2.1 g) was added thereto, and the reaction mixture was stirred at 65° C. for 24 hours. Insoluble matters were removed by filtering, and the filtrate was concentrated. The resulting residue was purified by means of column chromatography (silica gel, eluting solvent: toluene) to obtain 2,7-bis[4-(6-vinyloxyhexyloxy)benzoyloxy]-9-methylfluorene (1.04 g) of colorless crystal.

The phase transition temperature and the data by NMR analysis are shown below.

C 119 N 228 I.

$^1$H-NMR (CDCl$_3$): δ (ppm); 1.47–1.56(m, 8H), 1.54(s, 3H), 1.72–1.75(m, 4H), 1.83–1.87(m, 4H), 3.60–3.80(m, 5H), 3.98(dd, 2H), 4.20(t, 4H), 4.17(dd, 2H), 6.45(dd, 2H), 6.98(d, 4H), 7.25(dd, 2H), 7.36(d, 2H), 7.76(dd, 2H), 8.19(d, 4H).

Example 6

<Preparation of Polymerizable Composition and Production of Optically Anisotropic Film>

First Step

The compound of No. 56 was used to prepare the following composition:

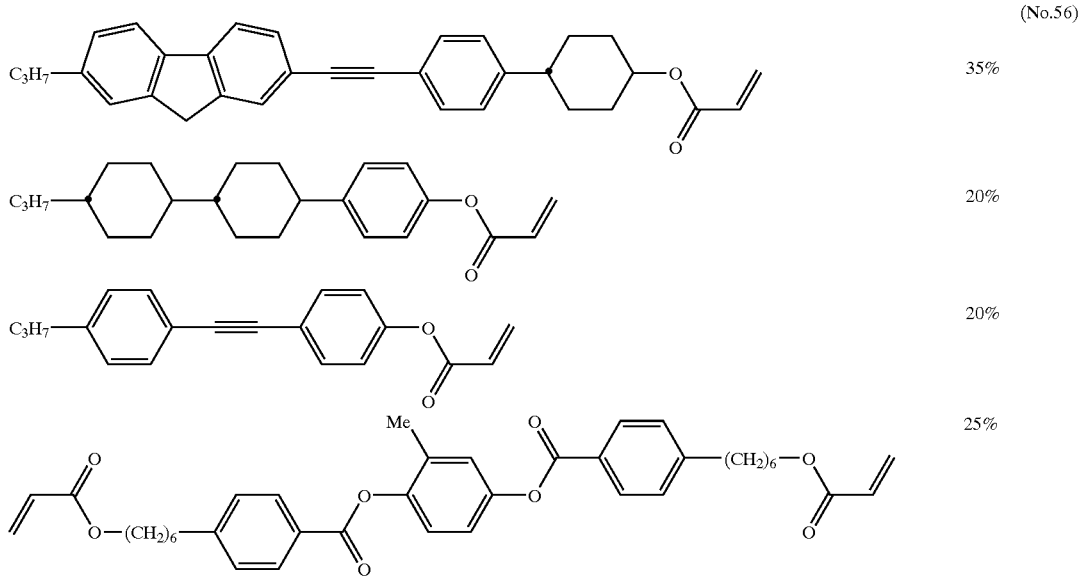

(No.56) 35%

20%

20%

25%

This composition showed a liquid crystal phase at a room temperature.

Second Step

Irugacure 184 (photopolymerization initiator manufactured by Ciba Geigy Co., Ltd., 4 mg) was added to the composition (100 mg) described above to prepare a polymerizable composition A. Two plates of glass substrates having an aligning film subjected to rubbing treatment were stuck together so that the aligning directions were parallel and the cell gap was 5 μm to prepare a cell. The polymerizable composition A was injected into this cell at 40° C. The cell into which the composition A was injected was allowed to come back to a room temperature and observed under a polarizing microscope to find that the texture of the liquid crystal phase was aligned in a rubbing direction. The cell was irradiated with a UV ray for 5 minutes by means of a 4W UV lamp having a wavelength of 365 nm while maintaining a room temperature. After irradiation, the glasses were peeled off to obtain an optically anisotropic film. It was confirmed by observation under a polarization microscope that good homogeneous-alignment was obtained in this film.

The weight average molecular weight (Mw) determined by GPC was 25,000, and the polymolecularity index (Mw/Mn) was 1.32. The melting point (Tm) was 200° C. or higher, and the heat resistance was excellent. This thin film had a pencil hardness of 3H.

Example 7

<Preparation of Polymerizable Composition and Production of Retardation film>

(First Step)

The compound of No. 56 was used to prepare the following composition:

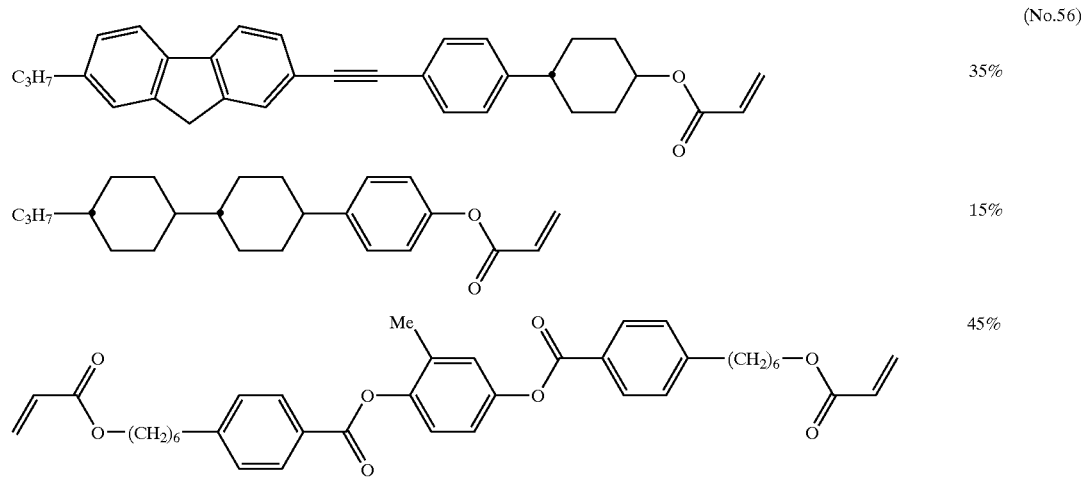

(No.56) 35%

15%

45%

-continued

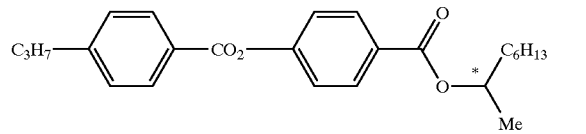

5%

This composition showed a chiral liquid crystal phase at a room temperature and had a helical pitch of 1.1 μm.

Second Step

Irugacure 184 (4 mg) previously described was added to the composition (100 mg) described above to prepare a polymerizable composition B. Two plates of glass substrates having an aligning film subjected to rubbing treatment were stuck together so that the aligning directions were parallel and the cell gap was 5 μm to prepare a cell. The polymerizable composition B was injected into this cell at 80° C. The cell into which the composition B was injected was allowed to come back to a room temperature and observed under a polarizing microscope to find that the texture of the chiral liquid crystal phase was aligned in a rubbing direction. The cell was irradiated with a UV ray for 5 minutes by means of a UV lamp of 4W having a wavelength of 365 nm while maintaining a room temperature. After irradiation, the glasses were peeled off to obtain a retardation film. It was confirmed by observation under a polarizing microscope that twisted nematic alignment was uniformly fixed in the film obtained. The weight average molecular weight (Mw) determined by GPC was 31,000, and the polymolecularity index (Mw/Mn) was 1.22. The melting point (Tm) was 200° C. or higher, and the heat resistance was excellent. This thin film had a pencil hardness of 3H.

Example 8
<Radical Polymerization of Fluorene Derivative>

A glass-made ampoule was charged with Compound No. 36 (0.2 g), ACN (0.01 g) described above and benzene (1 mL) and cooled down to −60° C., and it was sufficiently deaerated by means of a vacuum pump and sealed. The sealed ampoule was heated on a water bath of 70° C. for 24 hours, and then reprecipitation was carried out three times from methanol (150 mL) to obtain a polymer (0.9 g). The average molecular weight (Mw) determined by GPC was 12,000.

Example 9
<Aligning Film Using Polymer of Fluorene Derivative>

The polymer (0.5 g) produced in Example 8 was dissolved in NMP (N-methylpyrrolidone, 10 mL), and the solution was coated on two glass plates which were sufficiently washed, to obtain a even thickness by a spin coating method. These glass plates were heated at 150° C. for 3 hours to remove the solvent. The surfaces of polymer thin film on the respective glass plates were rubbed, and the two glass plates were combined so that the rubbing directions were the same to produce a vacant cell having a cell gap of 10 μm. A liquid crystal composition ZLI-1132 manufactured by Merck AG was injected into this cell by making use of a capillary phenomenon to produce a liquid crystal cell. It was confirmed that the liquid crystal was uniformly aligned in the cell.

Example 10
<Polymer of Fluorene Derivative>

A mixture of Compound No. 77 (50 mg) and Irugacure 184 (2 mg) was coated on a well washed glass plate. This glass plate was irradiated with a UV ray for 30 seconds by means of a UV lamp of 4W having a wavelength of 365 nm under nitrogen gas flow to obtain a polymer. A pencil hardness of this thin film was measured to find that it was 4H. Further, a part thereof was peeled off to carry out GPC analysis. Mw and the polymolecularity index were 9,800 and 1.29 respectively. Further, a phase transition point of the same sample was measured by DSC to find that the Tg point was 220° C. or higher.

Example 11
<Anti-Reflection Film Using Polymer of Fluorene Derivative>

The polymer (15 mg) produced in Example 10 was dissolved in chloroform to prepare a solution having a concentration of 1% by weight. A well washed glass substrate was dipped in this solution and then pulled up at a speed of 200 mm/minute, and it was dried at 120° C. for 10 minutes to form a thin film of the polymer of the fluorene derivative on the glass substrate. This glass substrate was dipped in an ethyl trifluoroacetate solution of a polymer (Mw: 11,000) of 1H,1H,2H,2H-perfluorodecyl acrylate to form a double layer thin film in the same manner. The resulting laminated thin film had a pencil hardness of 3H. Also, it had a spectral reflectance of 1% at 600 nm.

Example 12
<Polymer of Fluorene Derivative and Polarizer Using the Same>

A mixture of Compound No. 77 (50 mg), Irugacure 184 (2 mg) and an anthraquinone dichroic dye (2 mg) was coated on a glass plate on which an aligning film was formed and which was then subjected to rubbing treatment. It was observed under a polarizing microscope to find a liquid crystal phase which was uniformly homogeneous-aligned along a rubbing direction.

This glass plate was irradiated with a UV ray for 30 seconds by means of a UV lamp of 4W having a wavelength of 365 nm under nitrogen gas flow to obtain a polymer. The thin film of the polymer was peeled off from the glass substrate to obtain a polarizer.

INDUSTRIAL APPLICABILITY

The fluorene derivative which is the compound of the present invention can satisfy a large part of properties such as a broad temperature range of a liquid crystal phase, a high clearing point, a large optical anisotropy, a low viscosity, a high compatibility with the other liquid crystalline compounds, an excellent aligning property, a high photopolymerizing property and a high solubility in an organic solvent. Accordingly, the fluorene derivative of the present invention can be used as a component for a liquid crystal composition and can improve particularly a birefringence value and a low temperature compatibility of the liquid crystal composition. The polymer thereof can satisfy a large part of properties such as a heat resistance, a surface hardness, a large optical anisotropy, a low water permeability (a high hygroscopic dimensional stability), a high gas barrier property, an optimum heat contraction (an optimum thermal expansion coefficient), a small haze value, a high transparency, a suitable refractive index, a high solvent resistance, a high weatherability, a high glass transition point, a large light transmittance (a low light loss), a high wettability and an optimum thermal elasticity. It is excellent particularly in a mechanical strength and a heat resistance as compared with conventional polymers. The homopolymer or copolymer of the compound of the present invention is useful as a material for a retardation film, a polarizer, a liquid crystal aligning film, a anti-reflection film and a viewing angle compensation film for a liquid crystal display device.

What is claimed is:

1. A fluorene derivative represented by Formula (1):

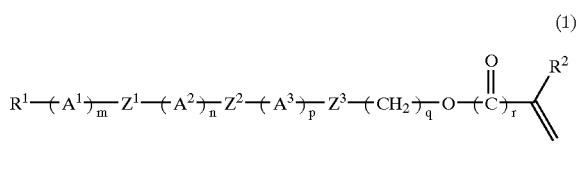

(1)

wherein $A^1$, $A^2$ and $A^3$ are independently a group represented by Formula (2), 1,4-cyclohexylene, 1,4-cyclohexenylene, 1,4-phenylene, pyridine-2,5-diyl, pyridazine-3,6-diyl, pyrimidine-2,5-diyl, dioxane-2,5-diyl, 1,4-cyclohexylene in which optional hydrogens are replaced by fluorines, or 1,4-phenylene in which optional hydrogens are replaced by fluorine and/or chlorine, and at least one of $A^1$, $A^2$ and $A^3$ is the group represented by Formula (2); m, n and p are independently 0 or 1, and the total thereof is 2 or 3; $R^1$ is —CN, —CF$_3$, —CF$_2$H, —CFH$_2$, —OCF$_3$, —OCF$_2$H, —N=C=O, —N=C=S —F, —Cl or alkyl having 1 to 20 carbon atoms, and in this alkyl, one hydrogen may be replaced by (meth)acryloyloxy or vinyloxy and optional —CH$_2$— may be replaced by —O—, —S—, —CF$_2$—, —CH=CH—, —COO—, —OCO— or —CO—; $R^2$ is hydrogen or methyl; $Z^1$, $Z^2$ and $Z^3$ are independently a single bond, —O—, —COO—, —OCO—, —CF$_2$O—, —OCF$_2$—, —CH$_2$O—, —OCH$_2$—, —CH$_2$CH$_2$—, —(CH$_2$)$_4$—, —CH=CH—, —CF=CF— or —C≡C—; q is an integer of 0 to 10; and r is 0 or 1:

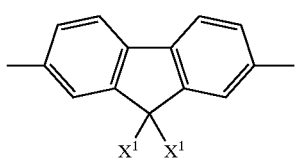

(2)

wherein two $X^1$'s are independently hydrogen, fluorine or alkyl having 1 to 8 carbon atoms; and when r is 0, at least one $X^1$ in Formula (2) is fluorine or alkyl having 1 to 8 carbon atoms.

2. The fluorene derivative defined in claim 1, wherein r is 1 and both of two $X^1$'s in Formula (2) are hydrogens.

3. The fluorene derivative defined in claim 1, wherein both of two $X^1$'s in Formula (2) are fluorines.

4. The fluorene derivative defined in claim 1, wherein $R^2$ in Formula (1) is hydrogen.

5. The fluorene derivative defined in claim 1, wherein $R^2$ in Formula (1) is methyl.

6. The fluorene derivative defined in claim 1, wherein in Formula (1), $R^1$ is alkyl or alkoxy, and $R^2$ is hydrogen.

7. The fluorene derivative defined in claim 1, wherein in Formula (1), $R^1$ is alkyl or alkoxy, and $R^2$ is methyl.

8. The fluorene derivative defined in claim 1, wherein in Formula (1), $R^1$ is alkyl or alkoxy; $R^2$ is hydrogen; r is 1; and both of two $X^1$'s in Formula (2) are hydrogens.

9. The fluorene derivative defined in claim 1, wherein in Formula (1), $R^1$ is alkyl or alkoxy; $R^2$ is methyl; and both of two $X^1$'s in Formula (2) are fluorines.

10. The fluorene derivative defined in claim 1, wherein in Formula (2), at least one $X^1$ is methyl.

11. The fluorene derivative defined in claim 1, wherein $R^1$ is a group having (meth)acryloyloxy or vinyloxy.

12. The fluorene derivative defined in claim 1, wherein in Formula (1), $A^2$ is the group represented by Formula (2); $A^1$ and $A^3$ are independently 1,4-cyclohexylene, 1,4-phenylene, 1,4-cyclohexylene in which optional hydrogens are replaced by fluorines, or 1,4-phenylene in which optional hydrogens are replaced by fluorine and/or chlorine; $R^1$ is a group represented by Formula (LT); $Z^3$ is —O—; and q is an integer of 2 to 10:

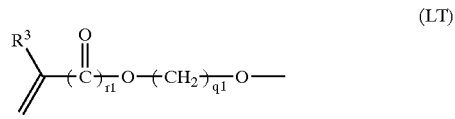

(LT)

wherein $R^3$ is hydrogen or methyl; r1 is 0 or 1; and q1 is an integer of 2 to 10.

13. The fluorene derivative defined in claim 1, wherein in Formula (1), $A^2$ is the group represented by Formula (2); $A^1$ and $A^3$ are independently 1,4-cyclohexylene, 1,4-phenylene or 1,4-phenylene in which optional hydrogen are replaced by fluorines; $R^1$ is a group represented by Formula (LT-1); $R^2$ is hydrogen; $Z^1$ and $Z^2$ are independently a single bond, —CH$_2$CH$_2$—, —COO— or —OCO—; $Z^3$ is —O—; r is 1; and q is an integer of 2 to 10:

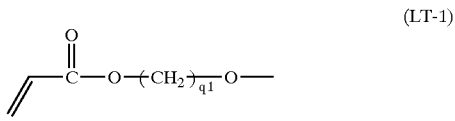

(LT-1)

wherein q1 is an integer of 2 to 10.

14. The fluorene derivative defined in claim 13, wherein in Formula (1), both of $Z^1$ and $Z^2$ are single bonds; and in Formula (2), two $X^1$'s are independently hydrogen or methyl.

15. The fluorene derivative defined in claim 13, wherein in Formula (1), both of $Z^1$ and $Z^2$ are —CH$_2$CH$_2$—; and in Formula (2), two $X^1$'s are independently hydrogen or methyl.

16. The fluorene derivative defined in claim 13, wherein in Formula (1), $Z^1$ is —COO—, and $Z^2$ is —OCO—; and in Formula (2), two $X^1$'s are independently hydrogen or methyl.

17. The fluorene derivative defined in claim 1, wherein in Formula (1), $A^2$ is the group represented by Formula (2); $A^1$ and $A^3$ are independently 1,4-cyclohexylene, 1,4-phenylene or 1,4-phenylene in which optional hydrogens are replaced by fluorines; $R^1$ is a group represented by Formula (LT-2); $R^2$ is hydrogen; $Z^1$ and $Z^2$ are independently a single bond, —CH$_2$CH$_2$—, —COO— or —OCO—; $Z^3$ is —O—; r is 0; and q is an integer of 2 to 10:

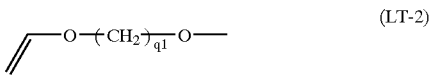

(LT-2)

wherein q1 is an integer of 2 to 10.

18. The fluorene derivative defined in claim 17, wherein in Formula (1), both of $Z^1$ and $Z^2$ are single bonds; and in Formula (2), two $X^1$'s are independently hydrogen or methyl.

19. The fluorene derivative defined in claim 17, wherein in Formula (1), both of $Z^1$ and $Z^2$ are —CH$_2$CH$_2$—; and in Formula (2), two $X^1$'s are independently hydrogen or methyl.

20. The fluorene derivative defined in claim 17, wherein in Formula (1), $Z^1$ is —COO—, and $Z^2$ is —OCO—; and in Formula (2), two $X^1$'s are independently hydrogen or methyl.

21. The fluorene derivative defined in claim 1, wherein in $A^1$, $A^2$ and $A^3$ in Formula (1), one of them is the group represented by Formula (2) and the other group(s) is(are independently) 1,4-cyclohexylene, 1,4-phenylene, 1,4-cyclohexylene in which optional hydrogens are replaced by fluorines, or 1,4-phenylene in which optional hydrogens are replaced by fluorine and/or chlorine.

22. The fluorene derivative defined in claim 1, wherein $R^1$ is a group having (meth)acryloyloxy or vinyloxy, and in $A^1$, $A^2$ and $A^3$ in Formula (1), one of them is the group represented by Formula (2) and the other group(s) is(are independently) 1,4-cyclohexylene, 1,4-phenylene, 1,4-cyclohexylene in which optional hydrogens are replaced by fluorines, or 1,4-phenylene in which optional hydrogens are replaced by fluorine and/or chlorine.

23. A liquid crystal composition comprising at least one of the fluorene derivatives defined in claim 22 and at least one other liquid crystalline compound which is polymerizable, other than the fluorene derivatives defined in claim 22.

24. A polymerizable composition comprising at least one of the fluorene derivatives defined in claim 22 and at least one other monomer than the fluorene derivatives defined in claim 22 and which may or may not show a liquid crystallinity.

25. A polymer obtained from the polymerizable composition defined in claim 24.

26. A liquid crystal display device comprising the polymer defined in claim 25.

27. A liquid crystal display device comprising a liquid crystal composition comprising at least one of the fluorene derivatives defined in claim 22 and at least one other liquid crystalline compound which is polymerizable, other than the fluorene derivatives defined in claim 22.

28. A liquid crystal composition comprising at least one of the fluorene derivatives defined in claim 1 and at least one other liquid crystalline compound which is polymerizable, other than the fluorene derivatives defined in claim 1.

29. A polymerizable composition comprising at least one of the fluorene derivatives defined in claim 1 and at least one other monomer than the fluorene derivatives defined in claim 1 and which may or may not show a liquid crystallinity.

30. A polymer comprising a structural unit represented by Formula (3):

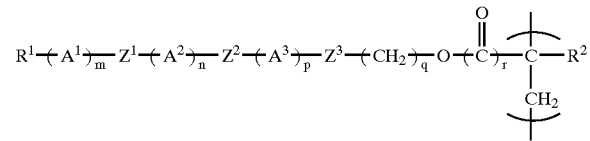

(3)

wherein $A^1$, $A^2$ and $A^3$ are independently a group represented by Formula (2), 1,4-cyclohexylene, 1,4-cyclohexenylene, 1,4-phenylene, pyridine-2,5-diyl, pyridazine-3,6-diyl, pyrimidine-2,5-diyl, dioxane-2,5-diyl, 1,4-cyclohexylene in which optional hydrogens are replaced by fluorines, or 1,4-phenylene in which optional hydrogens are replaced by fluorine and/or chlorine, and at least one of $A^1$, $A^2$ and $A^3$ is the group represented by Formula (2); m, n and p are independently 0 or 1, and the total thereof is 2 or 3; $R^1$ is —CN, —CF$_3$, —CF$_2$H, —CFH$_2$, —OCF$_3$, —OCF$_2$H, —N=C=O, —N=C=S, —F, —Cl or alkyl having 1 to 20 carbon atoms, and in this alkyl, one hydrogen may be replaced by (meth)acryloyloxy or vinyloxy and optional —CH$_2$— may be replaced by —O—, —S—, —CF$_2$—, —CH=CH—, —COO—, —OCO— or —CO—; $R^2$ is hydrogen or methyl; $Z^1$, $Z^2$ and $Z^3$ are independently a single bond, —O—, —COO—, —OCO—, —CF$_2$O—, —OCF$_2$—, —CH$_2$O—, —OCH$_2$—, —CH$_2$CH$_2$—, —(CH$_2$)$_4$—, —CH=CH—, —CF=CF— or —C≡C—; q is an integer of 0 to 10; and r is 0 or 1:

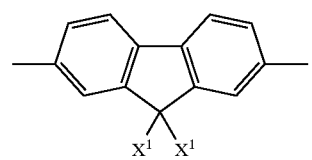

(2)

wherein two $X^1$'s are independently hydrogen, fluorine or alkyl having 1 to 8 carbon atoms.

31. An optically anisotropic film obtained from the polymer defined in claim 30.

32. An aligning film obtained from the polymer defined in claim 30.

33. An anti-reflection film obtained from the polymer defined in claim 30.

34. A retardation film obtained from the polymer defined in claim 30.

35. A viewing angle compensation film obtained from the polymer defined in claim 30.

36. A polarizer obtained from the polymer defined in claim 30.

37. A liquid crystal display device comprising the polymer defined in claim 30.

38. A liquid crystal display device comprising at least one of an optically anisotropic film, an aligning film, a reflection reducing film, the retardation film, a viewing angle compensation film and a polarizer, which are obtained from the polymer defined in claim 30.

* * * * *

UNITED STATES PATENT AND TRADEMARK OFFICE
CERTIFICATE OF CORRECTION

PATENT NO. : 6,824,709 B2
DATED : November 30, 2004
INVENTOR(S) : Ryushi Shundo

It is certified that error appears in the above-identified patent and that said Letters Patent is hereby corrected as shown below:

Columns 34-44,
Line 2, change the formula for No. 77 from

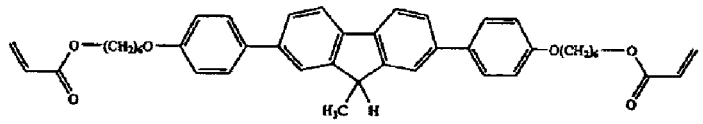

to

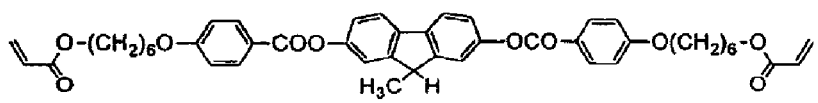

Columns 57-58,
Lines 40-48, change the formula for No. 77 from

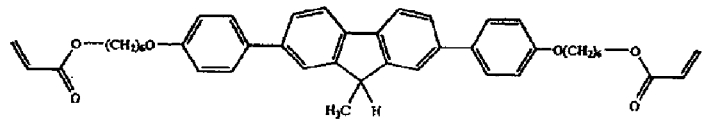

to

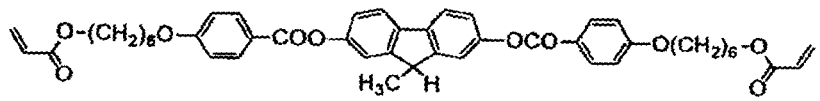

Signed and Sealed this

Tenth Day of May, 2005

JON W. DUDAS
*Director of the United States Patent and Trademark Office*